United States Patent
Fransen et al.

(10) Patent No.: US 10,324,621 B2
(45) Date of Patent: Jun. 18, 2019

(54) FACILITATING ANALYSIS OF USE INTERFACE GESTURE PATTERNS

(71) Applicant: Adobe Inc., San Jose, CA (US)

(72) Inventors: Peter Raymond Fransen, Soquel, CA (US); Christine Xuan Phan, University Place, WA (US)

(73) Assignee: Adobe Inc., San Jose, CA (US)

( * ) Notice: Subject to any disclaimer, the term of this patent is extended or adjusted under 35 U.S.C. 154(b) by 98 days.

(21) Appl. No.: 15/448,371

(22) Filed: Mar. 2, 2017

(65) Prior Publication Data
US 2018/0253224 A1 Sep. 6, 2018

(51) Int. Cl.
*G06F 9/451* (2018.01)
*G06F 3/0488* (2013.01)
*G06K 9/00* (2006.01)
*G06K 9/62* (2006.01)

(52) U.S. Cl.
CPC .......... *G06F 3/04883* (2013.01); *G06F 9/451* (2018.02); *G06K 9/00409* (2013.01); *G06K 9/6232* (2013.01)

(58) Field of Classification Search
CPC .................................................. G06F 3/0416
USPC ................................................ 715/745, 765
See application file for complete search history.

(56) References Cited

U.S. PATENT DOCUMENTS

| | | | | |
|---|---|---|---|---|
| 8,196,066 B1* | 6/2012 | Ouyang | ............. | G06F 3/04883 715/708 |
| 2009/0051648 A1* | 2/2009 | Shamaie | ................. | G06F 3/017 345/156 |
| 2014/0092031 A1* | 4/2014 | Schwartz | ............. | G06F 1/3206 345/173 |
| 2015/0146925 A1* | 5/2015 | Son | .................... | G06K 9/00624 382/103 |
| 2016/0004380 A1* | 1/2016 | Kim | ...................... | G06F 3/0416 345/174 |

* cited by examiner

*Primary Examiner* — Cao H Nguyen
(74) *Attorney, Agent, or Firm* — SBMC

(57) ABSTRACT

Facilitating analysis of user interface gesture patterns is described. In example implementations, a computing device acquires data that describes a user interface gesture pattern, such as finger movements on a touchscreen, in terms of pixels of a visual display. A repetitive arrangement of polygons, such as a grid of rectangles, is logically overlaid on the visual display. The computing device transforms the pixel-based data into polygon-based data that represents the gesture pattern in terms of polygons traversed by the gesture pattern. The computing device also converts the polygon-based data into text-based data such that the gesture pattern is represented by textual characters, such as a text string. The text string can include, for instance, a list of polygons traversed by the gesture pattern. The text-based data is forwarded to a service that can efficiently analyze relationships that may exist among multiple gesture patterns across multiple devices or end users.

20 Claims, 13 Drawing Sheets

1200 ⟶

1202

Receive, from multiple end-user computing devices, multiple text-based representations of gesture patterns of user interactions, each respective text-based representation including a string-type variable that characterizes a shape of a respective gesture pattern based on a repetitive arrangement of polygons overlaid on a visual display having an array of pixels, each polygon of the repetitive arrangement of polygons corresponding to multiple pixels of the array of pixels

1204

Perform an analysis operation on the multiple text-based representations

1206

Determine a gesture pattern relationship among at least a portion of the multiple text-based representations based on the analysis operation

FIG. 12

FACILITATING ANALYSIS OF USE INTERFACE GESTURE PATTERNS

BACKGROUND

Computing devices, such as smart phones and notebook computers, have transcended being important tools in the workplace to becoming critical parts of everyone's lives. For example, people use smart phones not only for aural and textual communications, but also to obtain news and other information, to make sales and purchases, to keep up with friends and family, to find and navigate to desired destinations, and to enjoy a myriad of entertainment options. Each of these capabilities is provided by some application executing on a computing device that an end user interacts with in order to access the capabilities. Consequently, the ability of an end user to utilize such capabilities is dependent on the applications providing an efficient and convenient interaction mechanism for utilizing these capabilities.

Thus, part of an application's effectiveness at providing some capability depends on the quality of the interaction between an end user and the application. This interaction can be characterized in terms of a user interface (UI) or overall user experience (UX). If the UI or UX is poor, an application will likely go unused. Conversely, if both the UI and the UX are designed and implemented well, the likelihood that an application will become popular increases dramatically. In other words, for an application to be embraced by end users, the application cannot merely offer functionality providing some capability, even if that capability is desired by end users. Instead, the application has to provide the capability in a manner that is simple to understand, that is easy to learn or better yet to discover without training, that requires few user actions to enter commands, and so forth.

Consequently, application developers invest significant resources trying to understand how end users interact with their applications. For example, an application can monitor end-user interactions such as which menu option or screen of an application an end user selected after receiving some text notification or which virtual buttons were pressed in what sequence. These kinds of conventional end-user interactions can be monitored and then reported to developers for analysis so that the application UI or UX can be improved.

Unfortunately, such conventional reports are insufficient to enable a developer to understand all of the ways in which end users are interacting with an application. First, these kinds of end-user interactions focus on end-user behavior at a relatively high level or from a Boolean perspective (e.g., whether a virtual button is or is not pressed). Second, some applications have many end users, perhaps upwards of tens of millions of end users. Organizing, correlating, and analyzing conventional usage information at this scale becomes difficult in terms of both time and processing resources. Third, conventional approaches to monitoring and reporting end-user interactions are not capable of handling all the various facets of end-user interactions with touch screens.

SUMMARY

Facilitating analysis of user interface gesture patterns is described. Techniques and systems described herein enable user interface gesture patterns, such as finger movements on a touchscreen, to be collected for analysis in manner that produces text-based representations of the gesture patterns. These text-based representations can be both more compact and simpler than pixel-based representations to facilitate storage and transmission of the collected gesture patterns. Further, processing is facilitated because an analysis service can leverage a multitude of well-known textual operations and analytical tools to look for relationships among gesture patterns from different end users or different computing devices. For example, standard text correlation facilities can be applied to determine if gesture patterns are similarly-shaped to one another. Moreover, described text-based formulations for user gesture patterns can be expressed in a manner that is independent of the location of a visual display over which the end user made the gesture pattern to further expand the flexibility of the analysis. These techniques and systems extract above a pixel-based representation to a polygon-based representation using, for instance, a regular arrangement of polygons that is logically laid over the visual display. The text-based representation is derived from the polygons over which a gesture pattern traverses using a textual identifier associated with each traversed polygon. These textual identifiers can also be device agnostic so that gesture patterns can be analyzed across different makes and models of computing devices.

In some implementations, a gesture pattern handling module generates text-based data representative of a user interface gesture pattern based on pixel-based data that is representative of the gesture pattern. The gesture pattern handling module acquires a pixel-based representation of a gesture pattern from a user interaction with a visual display of a computing device on which the module is executing. The gesture pattern traverses over multiple pixels of the visual display. A repetitive arrangement of polygons is superimposed over the multiple pixels of the visual display. For example, a grid of rectangles can be virtually superimposed across the visual display to logically separate the pixels into different rectangular cells.

The gesture pattern handling module transforms the pixel-based representation into a polygon-based representation of the gesture pattern based on multiple transitions made along a path of the gesture pattern between polygons of the repetitive arrangement of polygons. The module also converts the polygon-based representation into a text-based representation of the gesture pattern based on a directionality of each transition of the multiple transitions made between polygons along the path. The conversion is made using respective textual identifiers that are associated with respective polygons that are adjacent to a given polygon. The directionality, and textual identifier thereof, of each transition between polygons is thus relative to a current given polygon position along the path of the gesture pattern. The gesture pattern handling module also forwards the text-based representation to a service for an analysis operation including other text-based representations of other gesture patterns.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is presented with reference to the accompanying figures. In the figures, the left-most digit or two digits of a reference number identifies the figure in which the reference number first appears. The use of the same reference number in different instances in the description and the figures may indicate similar or identical items. Further, items represented in the figures may be indicative of one or more items, and thus reference may be made interchangeably to single or plural forms of the items in the description or in the drawings.

FIG. 12 is another flow diagram illustrating another example procedure in accordance with one or more example implementations.

DETAILED DESCRIPTION

Overview

Figure 1:
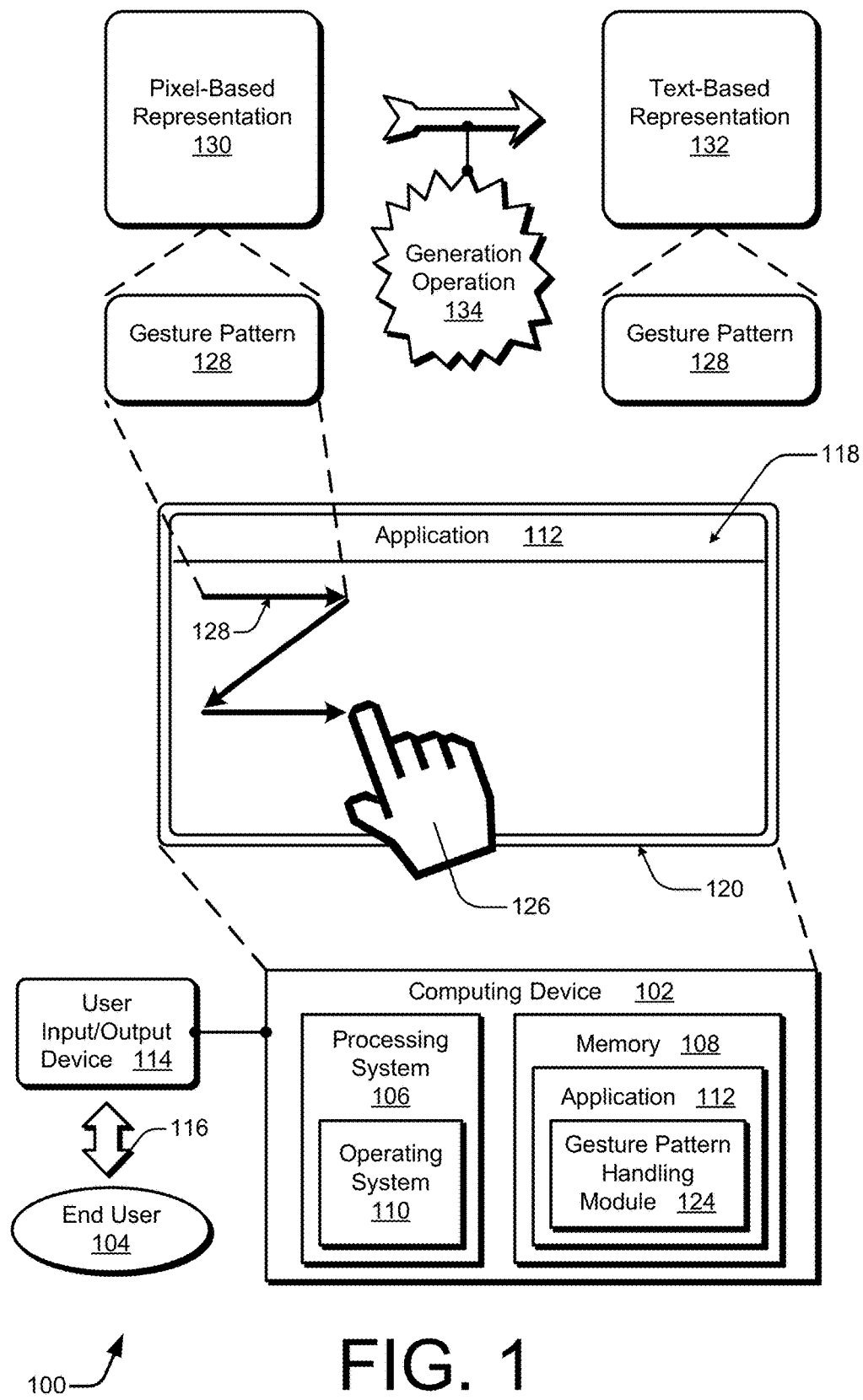
FIG. 1 illustrates an environment having a system for example implementations of facilitating analysis of user interface gesture patterns under operation of a gesture pattern handling module.

Conventional approaches to reporting end-user interactions with an application are insufficient to enable a developer to understand the multitude of ways in which end users are interacting with the application. For example, conventional end-user monitoring focuses on large-scale interactions such as when a menu item is selected. As another example of a large-scale interaction, a sequence may be recorded in which several virtual buttons or multiple nested menu items are pressed. However, small-scale interactions, such as manual gestures that traverse over a range of pixels of a visual display, are generally not reported to application developers.

Tracking small-scale interactions is a daunting proposition with conventional technology. If an application developer were to attempt to monitor and track each end-user touch interaction at a fine granularity, such as per-pixel, the amount of collected information would quickly become massive. Collecting information on the movement of each finger during each session with each computing device would create a significant quantity of data. Given the size of such a data set, deriving meaning from the data set would be difficult. Consequently, the analysis of user interface gestures would likely be limited to some small sampling percentage, such as less than 5%.

The per-pixel data would also need to be managed using proprietary data structures and data bases, which would be expensive and time consuming to build and maintain. Further, different computing devices have different screen sizes, different resolutions, and different operating systems (OSes), each of which usually detects and stores touch gestures differently. With all of these technical differences, correlating pixel coordinates to determine if different end users have made similar gestures becomes infeasible. Moreover, when gesture patterns are described in terms of pixel coordinates, it is difficult to determine that one gesture pattern that occurs at one location of a visual display is shaped similarly to another gesture pattern that occurs at a different location of another visual display, even if the visual displays are of the same size.

In contrast with conventional approaches, the analysis of user interface gesture patterns in accordance with implementations of the present invention is described herein using textual-based representations to characterize the gesture patterns. In one or more example implementations, a computing device acquires a pixel-based representation of a gesture pattern from a user interaction with a visual display of the computing device. A path of the gesture pattern covers multiple pixels of the visual display. The computing device also performs a transformation and a conversion of the pixel-based representation of the gesture pattern. To prepare for the transformation and the conversion, the computing device superimposes a repetitive arrangement of polygons over the multiple pixels of the visual display. Regular polygons, for instance, can be used to effectively segregate or group the pixels into different cells. Each single polygon covers, and effectively serves as a proxy for, multiple individual pixels. Consequently, fewer polygons are used to cover a visual display space as compared to the number of pixels of the display space. Thus, managing user interaction with respect to the repetitive arrangement of polygons involves less data as compared to managing user interaction with respect to a full pixel array for the visual display space.

Based on the repetitive arrangement of polygons, the computing device transforms the pixel-based representation into a polygon-based representation of the gesture pattern using those polygons over which the gesture pattern is determined to traverse. An example of a gesture pattern is a two-fingered vertical drag downward over a visual display. Knowledge of the identity of the precise pixels over which the gesture pattern is performed is likely forfeited by the transformation from the pixel-based representation to the polygon-based representation. For example, knowledge of the actual pixels traversed by the two fingers may be lost, but the two vertical strips of polygons that are retained for the polygon-based representation still convey at least the shape of the gesture. Many gesture patterns, including those typically performed using fingers or a hand, are interpreted by a computing device based on the shape of the gesture pattern, with little or any emphasis placed on the precise pixels over which the gesture pattern traverses. Thus, although some user interaction data is relinquished as a result of the transformation, the more pertinent portion of the user interaction data is retained after the transformation. The polygon-based representation is converted into a text-based representation of the gesture pattern using textual identifiers assigned to the determined polygons. A text-based representation for the two-fingered vertical downward drag can include "DDDD.DDDD" for a vertical swipe downward that traverses over four polygons with each finger. Other example text-based encoding approaches are described below. The computing device then forwards a version of the text-based representation of the gesture pattern to a service for analysis in conjunction with other text-based representations of other gesture patterns.

Text-based representations offer a number of advantages as compared to pixel-based representations that are native to individual computing devices. First, the text-based representations can be both more compact and simpler. Additionally, a multitude of automated tools and technical strategies already exist for analyzing string type variables. These tools and strategies can be leveraged by applying them to the text-based representations of gesture patterns. For example, standard text correlation tools can be applied to determine if different gesture patterns are similar to one another. Further, the text-based representations are device-agnostic such that gesture pattern representations from multiple different makes and models of computing devices can be analyzed and the results can be universally interpreted. The text-based representations can also be made independent of a location on a visual display over which the gesture pattern was detected by the computing device.

In one or more other example implementations, a computing device executes a gesture pattern handling module that generates a text-based representation of a gesture pattern from a pixel-based representation of the gesture pattern. The gesture pattern handling module includes five modules: a pixel-based representation acquisition module, a repetitive arrangement superimposition module, a transformation module, a conversion module, and a text-based representation forwarding module.

In operation, the computing device presents a visual display, which can be realized as a physical display screen, an image projection, or a virtual or augmented reality imaging. The visual display includes multiple pixels. Over, through, or otherwise with respect to some portion of the multiple pixels, an end user creates a gesture pattern. The gesture pattern is detected, and the pixel-based representation acquisition module acquires a pixel-based representation of the detected gesture pattern. The gesture pattern traverses multiple pixels of the visual display over some path to form some shape, such as the letter "C" or the letter "Z." Although the computing device detects the user input as a gesture pattern having some shape, the shape of the gesture pattern is not generally displayed on the visual display with gesture-based end-user interactions.

As detected by an operating system or application, the computing device initially represents the gesture pattern in a pixel-based manner as the pixel-based representation. For example, one or more pixel coordinates can be included in the pixel-based representation. Because pixel-based representations are unwieldy and cannot be universally analyzed across different hardware platforms and operating systems, the gesture pattern handling module generates the text-based representation from the pixel-based representation to facilitate the analysis thereof.

The repetitive arrangement superimposition module superimposes a repetitive arrangement over the visual display. The repetitive arrangement includes multiple polygons. Each polygon covers or includes multiple pixels of the visual display. A repetitive arrangement of polygons can be realized using, for instance, a grid of rectangles or a honeycomb of hexagons. The transformation module transforms the pixel-based representation of the gesture pattern into a polygon-based representation of the gesture pattern using the repetitive arrangement of polygons. For example, the transformation module determines a set of polygons of the repetitive arrangement of polygons over which the gesture pattern traverses. This transformation serves to effectively zoom out from a pixel level to a polygon level, which can reduce the amount of data to be processed or stored to handle gesture pattern representations.

The conversion module converts the polygon-based representation into a text-based representation. For example, the conversion module ascertains textual identifiers that respectively correspond to individual ones of the polygons of the set of polygons that are determined to have been traversed by the gesture pattern. To do so, a finite set of textual identifiers can be distributed around the polygons that are adjacent to a current given polygon as the path of the gesture pattern is traversed in polygon space one polygon at a time. Each textual identifier represents a directional transition from the given polygon to the next polygon, such as up, down, right, left, or diagonally up-and-to-the-right. As the path of the gesture pattern is traced, this set of textual identifiers is then moved forward for each next polygon in turn. This process produces an ordered list of textual identifiers indicative of a shape of the path over the repetitive arrangement of polygons. A position of the starting polygon can also be recorded. Although described separately, the functions of the transformation and conversion modules can be performed jointly or in an overlapping manner.

The forwarding module forwards the text-based representation to a gesture pattern analysis service. The gesture pattern analysis service can be offered locally at the computing device or remotely at another computing device. The gesture pattern analysis service is associated with a gesture pattern analysis module, which can analyze multiple text-based representations of multiple gesture patterns from multiple end users or multiple other computing devices. The analysis operation discovers relationships among at least the paths of the various gesture patterns, such as recognizing those paths that have similar shapes.

In these manners, gesture patterns can be represented using text-based data, such as with string-type variables. In comparison to pixel-based representations, the text-based representations occupy less bandwidth and can be analyzed more easily using known string-oriented tools and techniques. Using such analyses, an application designer can learn if a particular gesture created by end users is causing an application to crash. This allows for recreating a situation that precipitated the crash so that the application can be debugged more efficiently. Also, logging end-user interactions that include gesture patterns enables an application developer to replay end-user interactions for testing purposes. Further, by combining text-based gesture information with other application usage data, application developers can use these analytics to correlate gesture patterns with key metrics or desired end-user behaviors.

In the following discussion, after some example terminology is set forth, an example environment is described that may employ the techniques described herein. Example implementation systems, apparatuses, and techniques are then described, followed by a section explaining example implementation procedures. The procedures may be performed in the example environment and systems as well as in other environments and systems. However, performance of the example procedures is not limited to the example environment and systems, and the example environment and systems are not limited to performance of the example procedures.

Terminology Examples

Example descriptions or explanations of certain terms as used herein are set forth below. Each term is applicable to one or more, but not necessarily all, implementations presented herein. Some terms are further elucidated using one or more examples.

A "visual display" refers to a presentation by a computing device that can be visibly observed by an end user. Examples of visual displays include a physical display screen, such as a liquid crystal display (LCD) screen or an organic light-emitting diode (OLED) display screen of a smart phone; an image projection, such as from an entertainment system projector; an augmented reality (AR) or virtual reality (VR) imaging, such as that produced by AR glasses or a VR headset; and combinations thereof. A visual display can include multiple pixels.

A "pixel" refers to a picture element of a visual display. A picture element is, for example, the smallest visible element of the visual display that can be separately controlled in terms of color, brightness, and so forth. Pixels can be circles, rectangles, hexagons, and so forth. An image includes numerous pixels, which may be arranged in a grid or in another regular, repeated formation. As used herein, a pixel may also include a voxel, or volumetric pixel (aka, a volume element).

A "gesture pattern" refers to a path of movement made by an end user with a gesture implement, such as a finger, a stylus, or an optical or accelerometer/gyroscopic input sensor. The gesture pattern is detected by a computing device and interpreted as user input. The path of the gesture pattern is made over (e.g., on, through, or otherwise with respect to) pixels of a visual display as a form of user interaction with a computing device. The path can take some shape, such as a circle, the letter "Z," or a check mark. Thus, a gesture pattern can include one or more changes of direction at some location of the visual display.

A "pixel-based representation" refers to data that characterizes a gesture pattern using pixel information. The pixel information describes those pixels of the visual display over which the gesture pattern traverses. The pixel information can include one or more pixel coordinates of the visual display. The pixel information can identify each covered pixel individually, can use geometric equations to identify covered pixels (e.g., splines), can explicitly specify pixels that are end points of curves of a gesture pattern, some combination thereof, and so forth. The data of the pixel-based representation can be lengthy, complex, device or OS-specific, or tied to a particular location of the visual display.

A "repetitive arrangement of polygons" refers to a formation of geometric shapes that logically separate pixels of the visual display into different virtual cells. Each cell can therefore include or cover multiple pixels. Examples include a grid of rectangles, a two-dimensional array of hexagons or triangles, and so forth. As used herein, a polygon can include a polyhedron with respect to three-dimensional visual displays. Thus, a repetitive arrangement of polygons can include a three-dimensional grid of boxes, such as cubes. The repetitive arrangement of polygons is logically overlaid on the visual display to divide the visual display into cells and establish a polygon space for representing gesture patterns.

A "polygon-based representation" refers to data that characterizes a gesture pattern in terms of polygon information from a repetitive arrangement of polygons. The set of polygons that are traversed by the gesture pattern is determined, and this set of polygons is included in the polygon information. The polygons in the set of polygons can be ordered in accordance with the order in which the gesture pattern traverses the polygons. The determined polygons can be identified in absolute terms or in relative terms.

A "transition" refers to an event or a position thereof in which a path of a gesture pattern crosses from one polygon to another polygon. The transitions between two polygons at least indirectly determine which polygons are included in the set of polygons for the polygon-based representation. A directionality of a transition can be used to identify polygons in relative terms. For example, an upward transition indicates which polygon is a next polygon along a path of a gesture pattern relative to a current given polygon. Relative identifications of polygons for the set of polygons enables at least a shape of a gesture pattern to be established.

A "textual identifier" refers to an identification of a polygon that uses one or more text characters and can be included as part of a string-type variable. If each polygon of a repetitive arrangement of polygons is assigned a unique textual identifier, the resulting gesture pattern representation can be made in absolute terms, which places the gesture pattern representation at a particular location of a visual display. However, if each polygon of a repetitive arrangement of polygons is assigned one of a set of reusable textual identifiers that indicate a relative directional transition from a given polygon along a path of a gesture pattern, then the resulting gesture pattern representation can be made in relative terms and independently of a location of the visual display.

A "text-based representation" refers to data that characterizes a gesture pattern using textual information. Each polygon that is determined to be traversed by the gesture pattern, or that is included as part of the polygon-based representation, has a corresponding textual identifier included in the text-based representation. The textual identifiers can be ordered in accordance with the order in which the gesture pattern traverses the polygons of the repetitive arrangement of polygons. The text-based representation conveys information that describes at least the relative shape of the corresponding gesture pattern. The text-based representation can also include or be associated with a pixel or polygon identification that locates the corresponding gesture pattern on the visual display.

Also, unless context dictates otherwise, use herein of the word "or" may be considered use of an "inclusive or," or a term that permits inclusion or application of one or more items linked by the word "or" (e.g., a phrase "A or B" may be interpreted as permitting or being relevant to just "A," to just "B," or to both "A" and "B"). Further, items represented in the accompanying figures and terms discussed herein may be indicative of one or more items or terms, and thus reference may be made interchangeably to single or plural forms of the items and terms in this description.

Example Environment

FIG. 1 illustrates an environment having a system 100 for example implementations that are operable to facilitate the analysis of user interface gesture patterns with a gesture pattern handling module 124. As illustrated, the example system 100 includes at least one computing device 102 and at least one user input/output (I/O) device 114. The computing device 102 includes a processing system 106 and a memory 108. The processing system 106 includes an operating system 110. The memory 108 stores an application 112, which includes the gesture pattern handling module 124. Example implementations for the computing device 102 and the gesture pattern handling module 124 are described further below in this section. For the example environment, FIG. 1 depicts an end user 104 and a user interaction between the end user 104 and the user I/O device 114 that produces a user control signal 116. The environment further includes a gesture pattern 128 created by a gesture implement 126.

As shown on a display screen 120 associated with the computing device 102, the application 112 or the operating system 110 includes or generates a user interface 118. The computing device 102 provides the user interface 118 to present output to the end user 104 or to accept input from the end user 104 via the user control signal 116. The application 112 can be realized as any computer program that is responsive to gesture input from the gesture implement 126. Examples of gesture implements 126 include fingers, styluses, hands, motion controlled devices (e.g., with optical or accelerometer sensors), track pads programmed to detect gesture inputs (e.g., in contrast with mere cursor movements), and so forth. The operating system 110 or the application 112 detects the gesture pattern 128 responsive to movement of the gesture implement 126 that provides a detectable user interaction, which is interpreted as the user control signal 116. Although shown in the context of a device with a physical visual display that enables touchscreen interaction, the user interface 118 can alternatively be realized with a projected physical display, an augmented or virtual reality display, some combination thereof, and so forth in which the gesture pattern 128 is detected using optical sensors, inertial sensors, and so forth.

In an example implementation, the gesture pattern handling module 124 performs a generation operation 134 to generate a text-based representation 132 of a gesture pattern 128 from a pixel-based representation 130 of the gesture pattern 128. As shown with respect to the user interface 118, the end user 104 has used a gesture implement 126, such as a finger, to create a gesture pattern 128. Here, the gesture pattern 128 takes the shape of the letter "Z." In FIG. 1, the path of the gesture pattern 128 is depicted with three separate segments, each of which is an arrow that indicates a change of direction for the gesture. Although three separate arrows are used to depict the path of the gesture pattern to show internal directional changes, the three arrows represent one gesture pattern 128 in the sense that the gesture implement 126 is not removed from the visual display screen 120 during the creation of the gesture pattern 128 (e.g., the finger maintains contact with the screen surface through the movement creating the Z-shaped path).

As detected by the operating system 110 or the application 112, the gesture pattern 128 is initially represented in a pixel-based manner. For example, a pixel-based representation 130 can include a pixel coordinate or data that maps to a pixel coordinate. Because pixel-based representations 130 are unwieldy and cannot be analyzed universally, the gesture pattern handling module 124 performs the generation operation 134. With the generation operation 134, the gesture pattern handling module 124 generates the text-based representation 132 from the pixel-based representation 130. The text-based representation 132 includes one or more textual components that represent at least a shape of the gesture pattern 128. Examples for the pixel-based representation 130 and the text-based representation 132 are described below with reference to FIG. 3.

The computing device 102 can be implemented as any suitable type of computing device. Examples of end-user implementations for the computing device 102 include a desktop computer, a laptop or notebook computer, a mobile device (e.g., assuming a handheld configuration such as a tablet, a phablet, or a mobile phone—which is depicted in FIG. 1), a mobile device coupled to a separate screen, an entertainment appliance such as a smart television, a game console, a wearable computing device such as a smart watch or intelligent glasses, a virtual or augmented reality device, or some combination thereof. Thus, an end-user implementation of the computing device 102 may range from a relatively high-resource device with substantial memory and processor resources (e.g., a personal computer or game console) to a relatively low-resource device with constrained memory or processing resources (e.g., a mobile device such as a wearable computer). Examples of data center or server device implementations for the computing device 102 include a web server, a server running open source software, a server of a proprietary design, a standalone server, a server blade, an allocated portion of a server farm, server functionality that is distributed across at least one data center, cloud computing functionality, or some combination thereof.

The computing device 102 is illustrated as including a variety of hardware components: a processing system 106, an example of a computer-readable storage medium illustrated as memory 108, and so forth. Other hardware components are also contemplated as described herein with reference to FIG. 13. The processing system 106 is representative of functionality to perform operations through execution of instructions stored in the memory 108. Although illustrated as two separate components, functionality of the processing system 106 and the memory 108 may be combined into one component (e.g., on an application specific integrated circuit (ASIC) or during operation as instructions are loaded from the memory onto a processor) or may be further divided into a greater number of components. Examples of a user I/O device 114 include a keyboard, a mouse, a touchpad, a touch screen, a microphone, a camera, an optical or accelerometer-based motion sensor, a display device such as a screen or projector, a speaker, or some combination thereof. The user I/O device 114 may be separate from or integrated with the computing device 102. The computing device 102 is further illustrated as including an operating system 110. The operating system 110 is programmed to abstract underlying hardware functionality of the computing device 102 to the application 112 that is executable on the computing device 102.

In example implementations, the gesture pattern handling module 124 is resident at or executing on the computing device 102, such as by being part of the application 112 (as shown) or the operating system 110. The gesture pattern handling module 124 represents functionality to implement schemes and techniques for facilitating the analysis of user interface gesture patterns as described herein. The gesture pattern handling module 124 can be implemented as at least part of a software package that executes on and specially configures one or more processors, which processors may physically realize the processing system 106; as a hardware apparatus, which may be realized as an ASIC or as the computing device 102; or using a combination of software, firmware, hardware, or fixed logic circuitry; with some combination thereof; and so forth. As described herein with reference to FIGS. 8, 9, and 13, the gesture pattern handling module 124 may be fully or partially implemented as a web or cloud based design-oriented service.

Systems and Techniques

Figure 2:
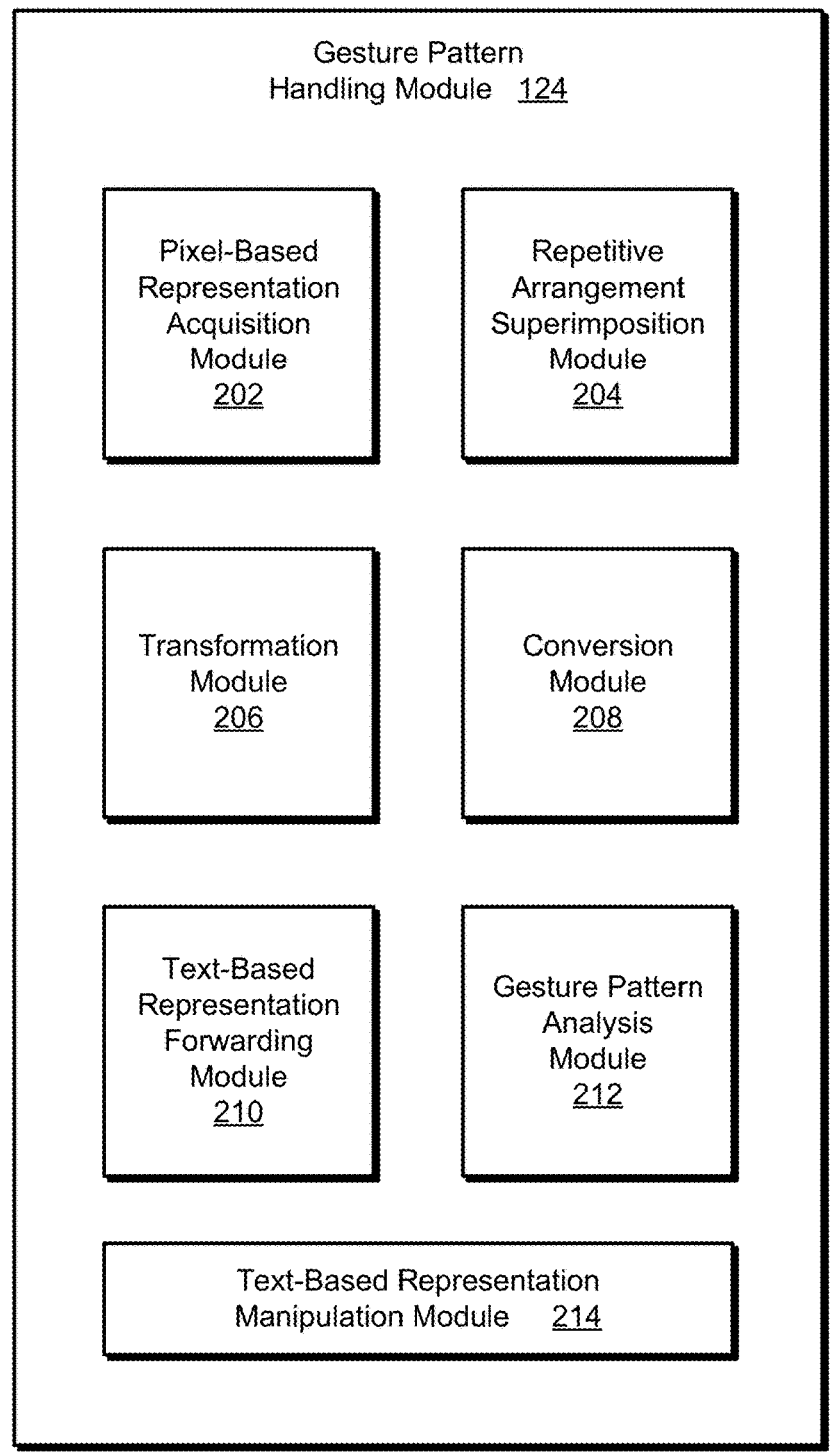
FIG. 2 depicts an example of a gesture pattern handling module that acquires as input a pixel-based representation of a gesture pattern and forwards a text-based representation of the gesture pattern.

FIG. 2 depicts an example of a gesture pattern handling module 124 that acquires as input a pixel-based representation 130 of a gesture pattern 128 and forwards a text-based representation 132 of the gesture pattern 128. As shown, the gesture pattern handling module 124 includes seven modules: a pixel-based representation acquisition module 202, or acquisition module 202; a repetitive arrangement superimposition module 204, or superimposition module 204; a transformation module 206; a conversion module 208; a text-based representation forwarding module 210, or forwarding module 210; a gesture pattern analysis module 212, or analysis module 212; and a text-based representation manipulation module 214, or manipulation module 214. However, the gesture pattern handling module 124 can alternatively include more, fewer, or different modules.

In example implementations, the acquisition module 202 acquires a pixel-based representation 130 of a gesture pattern 128 from a user interaction with a visual display of a computing device 102, with the gesture pattern 128 traversing over multiple pixels of a visual display. Example approaches for realizing the acquisition module 202 are described below with reference to FIG. 4. The superimposition module 204 superimposes a repetitive arrangement of polygons over the multiple pixels of the visual display. Example approaches for realizing the superimposition module 204 are described below with reference to FIG. 5.

The transformation module 206 transforms the pixel-based representation 130 into a polygon-based representation of the gesture pattern 128 based on multiple transitions between polygons of the repetitive arrangement of polygons. Example approaches for realizing the transformation module 206 are described below with reference to FIG. 6. The conversion module 208 converts the polygon-based representation into a text-based representation 132 of the gesture pattern 128 based on a directionality of each transition of the multiple transitions between polygons. The directionality is determined relative to a given polygon position along a path of the gesture pattern. Example approaches for realizing the conversion module 208 are described below with reference to FIG. 7.

The forwarding module 210 forwards the text-based representation 132 to a service for analysis, whether the service is local or remote with respect to a computing device on which one or more of the other modules are executing. Example approaches for realizing the text-based representation forwarding module 202 are described below with reference to FIG. 8. Example schemes for implementing the functionality of the group of modules 202-210 are described below with reference to FIG. 3.

The gesture pattern analysis module 212 performs an analysis operation on multiple gesture patterns from multiple end users or from multiple end-user computing devices, with each of the gesture patterns comporting with a text-based representation 132. The analysis can determine a relationship among the multiple text-based representations 132, such as a correlation that indicates a similarity among the underlying gesture patterns. Example approaches for realizing the gesture pattern analysis module 212 are described below with reference to FIG. 9. The text-based representation manipulation module 214 manipulates data in a pixel-based format, in a polygon-based format, or in a text-based format so as to simplify or compress the data in the text-based format for the text-based representation 132. Example approaches for realizing the manipulation module 214 are described below with reference to FIG. 10.

Any one or more of the seven modules 202-214 of the gesture pattern handling module 124 as depicted in FIG. 2 can be resident at or executing on an end-user computing device 102 (as depicted in FIG. 1). Additionally or alternatively, any one or more of the seven modules 202-214 of the gesture pattern handling module 124 can be resident at or executing on at least one server of a data center as part of cloud computing functionality (e.g., a server computing device). Further, one or more of the modules 202-214 can be resident at or executing on at least one server of a data center as part of cloud computing functionality, and one or more other ones of the modules 202-214 can be resident at and executing on a client-side end-user computing device, with the modules interacting with one another remotely to implement some functionality that is described herein.

Figure 3:
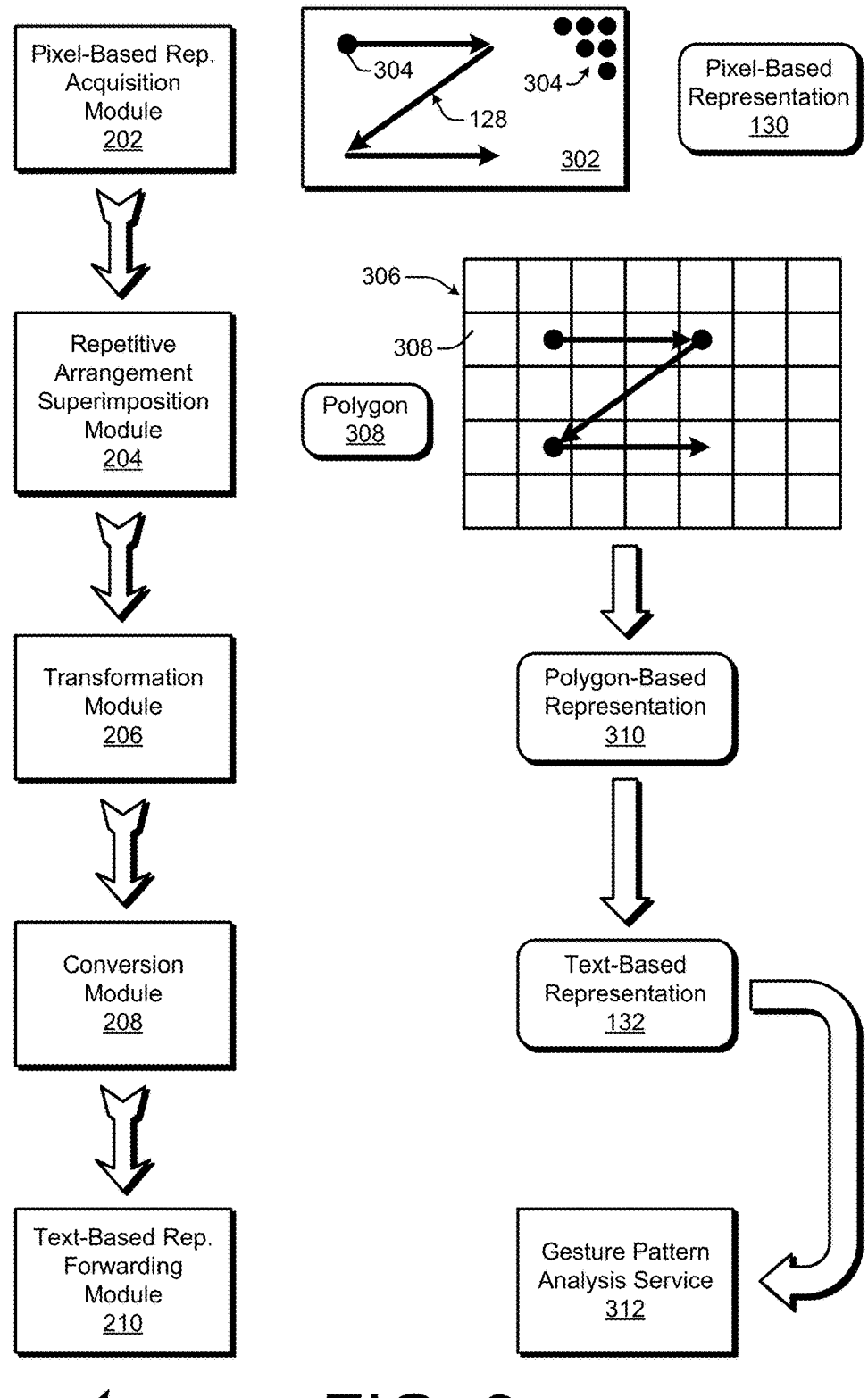
FIG. 3 illustrates an example scheme for facilitating analysis of user interface gesture patterns by generating a text-based representation of a gesture pattern from a pixel-based representation of the gesture pattern.

FIG. 3 illustrates an example scheme 300 for facilitating analysis of user interface gesture patterns by generating a text-based representation 132 of a gesture pattern 128 from a pixel-based representation 130 of the gesture pattern 128. Illustrated operations proceed from top to bottom. Starting from the top of FIG. 3, the pixel-based representation acquisition module 202 acquires the pixel-based representation 130. A computing device presents a visual display 302, which can be realized as a physical display screen, an image projection, a virtual or augmented reality imaging, and so forth. The visual display 302 includes multiple pixels 304. Over some portion of the multiple pixels 304, an end user creates the gesture pattern 128.

As shown, the gesture pattern 128 has the shape of the letter "Z." In FIG. 3, the path of the gesture pattern 128 is depicted with three separate segments, each of which is an arrow that indicates a direction, and a change thereof, for the gesture. Although three separate arrows are used to depict the path of the gesture to show internal directional changes, the three arrows represent one gesture pattern 128 in the sense that the gesture implement 126 (of FIG. 1) is not removed from the visual display during the creation of the gesture pattern 128. Although the path of the gesture pattern 128 is depicted in various places of the accompanying figures for clarity, the path of the gesture pattern 128 is not generally presented on an actual visual display 302.

As detected by an operating system or application, the gesture pattern 128 is initially represented in a pixel-based manner as the pixel-based representation 130. For example, one or more pixel coordinates can be included in the pixel-based representation 130. Because pixel-based representations 130 are unwieldy and cannot be universally analyzed across different hardware platforms and operating systems, the scheme 300 generates the text-based representation 132 from the pixel-based representation 130 as described next. The pixel-based representation acquisition module 202 can obtain the pixel-based representation 130 from, for example, the operating system.

The repetitive arrangement superimposition module 204 superimposes a repetitive arrangement 306 over the visual display 302. The repetitive arrangement 306 includes multiple polygons 308. Each polygon 308 includes or covers multiple pixels 304 of the visual display 302. As shown, the repetitive arrangement 306 forms a grid of rectangles and is illustrated in conjunction with the Z-shaped gesture pattern 128. The transformation module 206 transforms the pixel-based representation 130 of the gesture pattern 128 into a polygon-based representation 310 of the gesture pattern 128 using the repetitive arrangement 306. For example, the transformation module 206 determines a set of polygons 308 of the multiple polygons of the repetitive arrangement 306 over which the gesture pattern 128 traverses.

The conversion module 208 converts the polygon-based representation 310 into the text-based representation 132. For example, the conversion module 208 ascertains textual identifiers that respectively correspond to those polygons 308 of the set of polygons 308 that are determined to have been traversed by the gesture pattern 128. A finite set of textual identifiers can be distributed around the polygons 308 that are adjacent to a given polygon 308. As the path of the gesture pattern 128 is traced, this set of textual identifiers is then moved forward to surround the next polygon 308 in turn. Example implementations for textual identifiers are described below with reference to FIG. 7. Although shown separately, the functions of the transformation module 206 and the conversion module 208 can be performed jointly, at least partially simultaneously, or in an overlapping manner.

The forwarding module 210 forwards the text-based representation 132 to a gesture pattern analysis service 312. The gesture pattern analysis service 312 can be offered locally at a given computing device or remotely at another computing device. The gesture pattern analysis service 312 is associated with the gesture pattern analysis module 212 (of FIGS. 2, 8, and 9), which can analyze multiple text-based representations 132 of gesture patterns 128 to discover relationships among at least the shapes of the corresponding gesture patterns 128.

Figure 4:
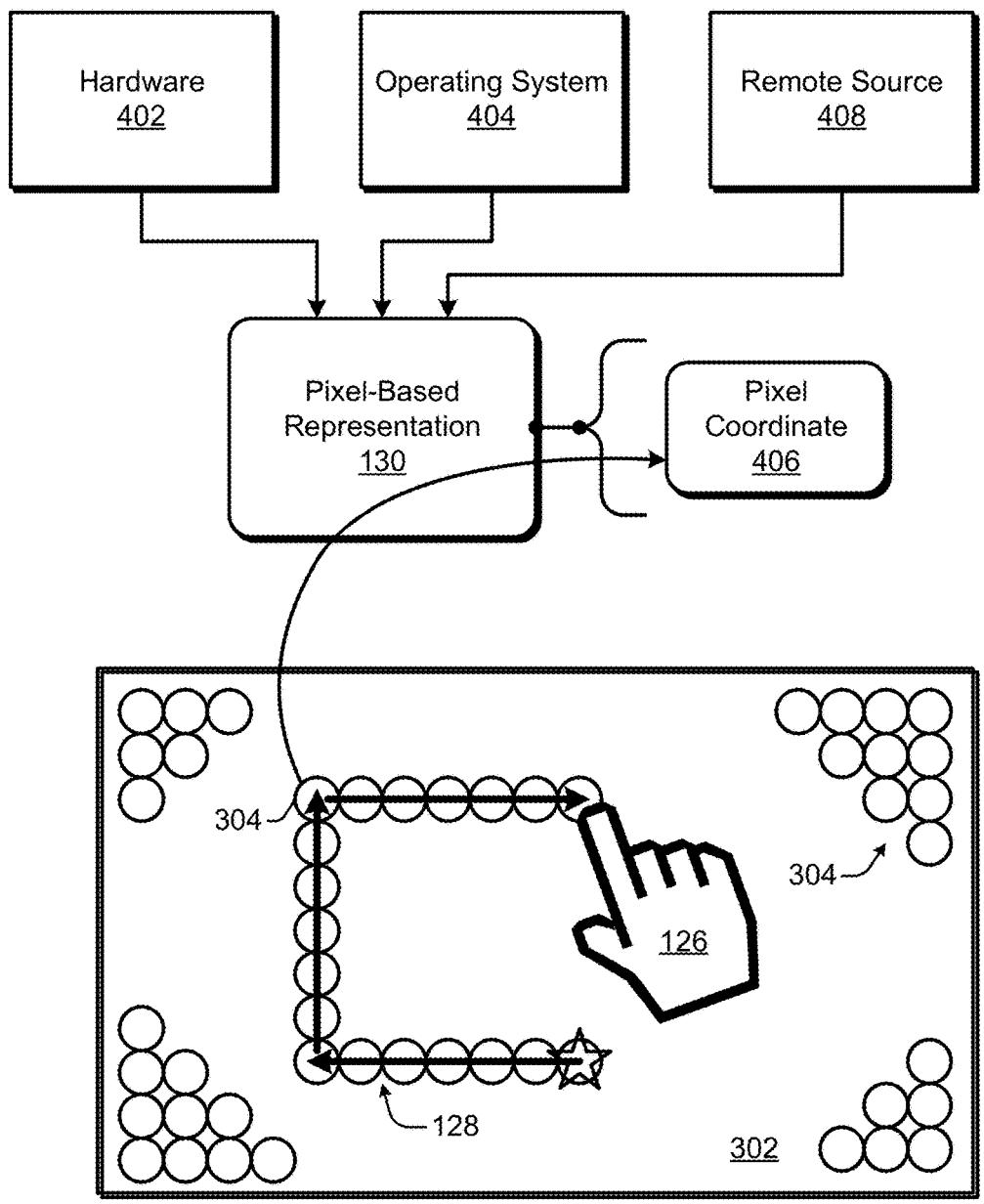
FIG. 4 illustrates an example approach for acquiring a pixel-based representation of a gesture pattern.

FIG. 4 illustrates an example approach 400 for acquiring a pixel-based representation 130 of a gesture pattern 128. The pixel-based representation acquisition module 202 implements the approach 400. A visual display 302 having multiple pixels 304 is depicted, with some pixels omitted for visual clarity. A gesture pattern 128 is shown with a different shape than that of FIGS. 1 and 3. The shape of this gesture pattern 128 corresponds to the letter "C". The "star" shape indicates a beginning of the gesture pattern 128, and the three arrows indicate a direction of movement by the gesture implement 126. Thus, the gesture implement 126 starts by interacting with the visual display 302 (e.g., touching the visual display) at the star shape and moves leftward, upward, and then rightward. At the top right corner of the "C" shape, the gesture pattern 128 ends when the gesture implement 126 ceases interaction with the visual display 302 (e.g., is removed from a touch screen). The items of the figures are not necessarily depicted to a common scale. For example, the gesture implement 126 may cover a width of multiple pixels along each segment of the path of the gesture pattern 128, particularly if a finger or similar is used.

The acquisition module 202 acquires the pixel-based representation 130 from any of one or more sources. For example, the acquisition module 202 can obtain the pixel-based representation 130 directly from local hardware 402, such as display hardware, graphics hardware, input/output hardware, and so forth. The acquisition module 202 can also obtain the pixel-based representation 130 from a local operating system 404 that acts as an intermediary between an application and the hardware or a driver thereof. Alternatively, the acquisition module 202 can obtain the pixel-based representation 130 from a remote source 408, such as by receiving the pixel-based representation 130 from another computing device. The other computing device can be, for instance, an end-user computing device if the acquisition module 202 is executing at a server computing device.

The pixel-based representation 130 serves to describe at least a shape or path of a gesture pattern 128 in terms of one or more pixel coordinates 406. Pixel coordinates 406 include a value for each dimension of a display, such as two or three dimensions. Thus, pixel coordinates 406 can also implicitly indicate a location of the gesture pattern 128 with respect to the visual display 302. For the pixel-based representation 130, the pixel coordinates 406 of each pixel 304 traversed by the gesture pattern 128 can be recorded. Alternatively, the pixel coordinates 406 of pixels 304 where a direction of path movement changes (e.g., at the beginning or end of an arrow) can be recorded. However, other pixel-based representations 130 may be implemented instead.

Figure 5:
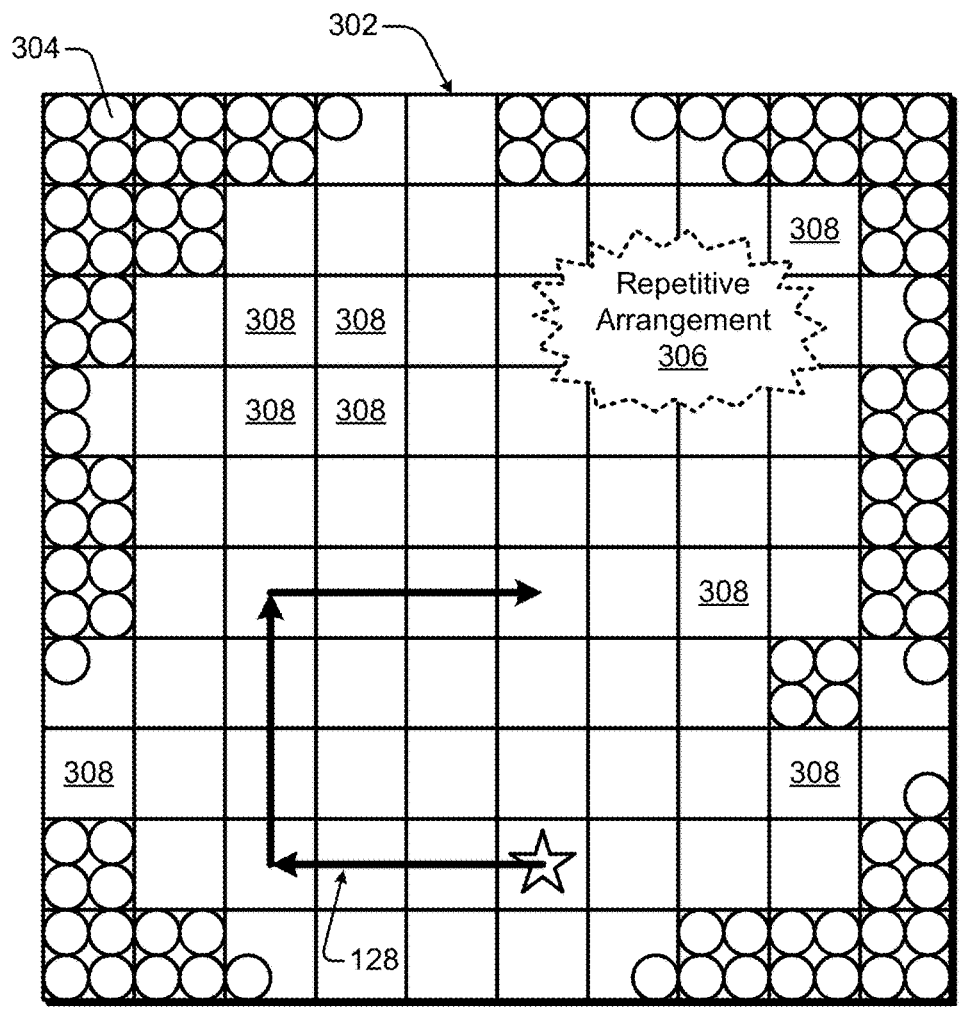
FIG. 5 illustrates an example approach for overlaying a repetitive arrangement of polygons on a visual display including an array of pixels.

FIG. 5 illustrates an example approach 500 for overlaying a repetitive arrangement 306 of polygons 308 on a visual display 302 including an array of pixels 304. The repetitive arrangement superimposition module 204 implements the approach 500. The visual display 302, such as a liquid crystal display (LCD) screen or an organic light-emitting diode (OLED) display screen, includes multiple pixels 304 arranged in an array. The superimposition module 204 overlays the repetitive arrangement 306 on the visual display 302. The repetitive arrangement 306 is overlaid logically, such as in memory or by a processing system. The repetitive arrangement 306 is not typically displayed to an end user.

The repetitive arrangement 306 includes multiple polygons 308. Each polygon 308 is associated with or includes multiple pixels 304. As is apparent from FIG. 5, the "C"-shaped gesture pattern 128 traverses over multiple polygons 308 of the repetitive arrangement 306. Generally, a repetitive arrangement 306 includes repeated instances of some type of polygon, which may be repeated at regular intervals. In FIG. 5, the repetitive arrangement 306 is instituted with a grid having rectangular polygons 308, such as squares or rectangles. However, other repetitive arrangements may be implemented instead of a grid having rectangles. For example, other repetitive arrangements 306 may be formed from other regular polygons. A honeycomb arrangement may be formed from regular hexagons. A mesh arrangement may be formed from equilateral triangles. Other regular and irregular polygons may alternatively be employed to form a repetitive arrangement 306.

In some implementations, each polygon 308 includes a same number of pixels 304 across different physical or resolution sizes of visual displays 302. For the sake of simplicity, each polygon 308 can correspond to a rectangle having 10×10 pixels, 10×5 pixels, and so forth. Alternatively, to foster consistency across visual displays 302 of different resolutions or physical sizes so as to facilitate analysis of gesture patterns 128, the polygons 308 are scaled. For example, the polygons 308 of the repetitive arrangement 306 can be scaled to correspond to a substantially common physical distance across different visual displays 302 having different physical sizes. Each polygon can be scaled so as to cover 1 mm×1 mm, $\frac{1}{16}$ in×$\frac{1}{32}$ in, and so forth. Here, a substantially common physical distance refers to physical distances that are the same or as close to the same as is feasible given minimum physical pixel sizes or pitches thereof, given the remainder spacing at the edge of a visual display, and so forth. As another example, the polygons 308 of the repetitive arrangement 306 can be scaled such that a substantially common number of polygons 308 spans across each visual display 302 of different visual displays having different physical sizes. Each visual display 302 can be segregated into a grid of 100×100 rectangles, 300×200 rectangles, and so forth. Thus, rectangles on different devices may include a different number of pixels 304 or correspond to a different physical size with this type of scaling. Here, a substantially common number of polygons refers to the same or the similar number of polygons that is feasible given hardware limitations, such as different screen aspect ratios or proportions.

Figure 6:
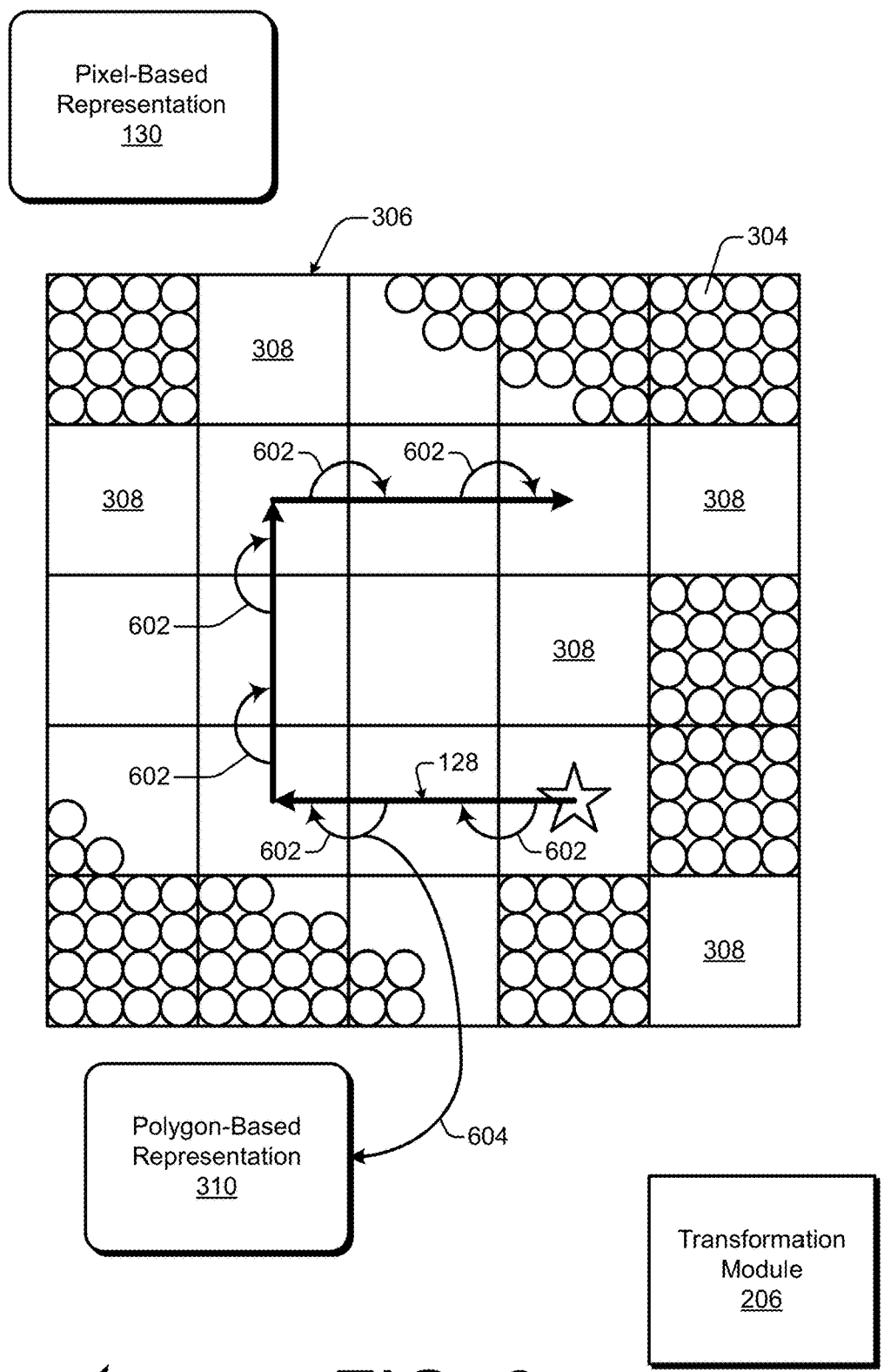
FIG. 6 illustrates an example approach for transforming the pixel-based representation of the gesture pattern into a polygon-based representation of the gesture pattern.

FIG. 6 illustrates an example approach 600 for transforming the pixel-based representation 130 of the gesture pattern 128 into a polygon-based representation 310 of the gesture pattern 128. The transformation module 206 implements the approach 600. Using the repetitive arrangement 306 of polygons 308, the transformation module 206 transforms the pixel-based representation 130 into the polygon-based representation 310. To transform pixel-based data into polygon-based data, the transformation module 206 determines a set of polygons 308 over which the gesture pattern 128 traverses. Including the starting polygon 308 as indicated by the star, the gesture pattern 128 traverses seven polygons 308. Thus, the polygon-based representation 310 can include six polygons 308 in addition to the starting polygon 308.

To traverse over multiple polygons 308, the path of the gesture pattern 128 transitions 602 from one polygon to a next polygon multiple times. These transitions 602 are represented by arcs in FIG. 6. As part of the operation to produce the polygon-based representation 310, the transformation module 206 determines and records 604 these transitions 602 along the path of the gesture pattern 128. These transitions 602 therefore reflect the C-shape of the gesture pattern 128. As shown, the transformation module 206 records 604 six transitions 602: leftward, leftward, upward, upward, rightward, and rightward. Example approaches to recording 604 these transitions 602 are described below with reference to FIG. 7. Also, although the six transitions 602 that are depicted in FIG. 6 are straight transitions, transitions 602 can also be made in a diagonal manner, as illustrated in FIG. 7.

Figure 7:
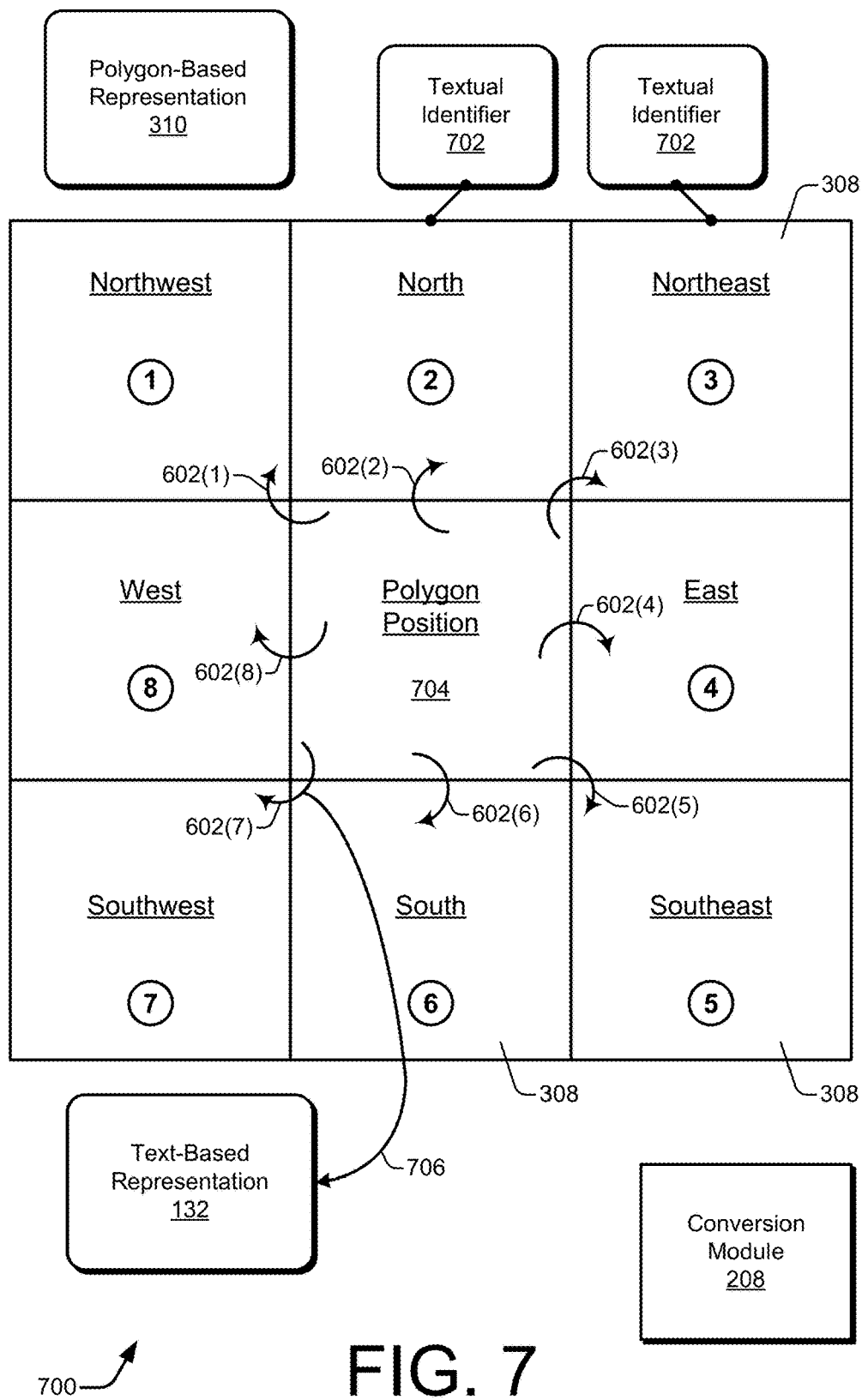
FIG. 7 illustrates an example approach for converting the polygon-based representation of the gesture pattern into a text-based representation of the gesture pattern.

FIG. 7 illustrates an example approach 700 for converting the polygon-based representation 320 of the gesture pattern 128 into a text-based representation 132 of the gesture pattern 128. The conversion module 208 implements the approach 700. To convert polygon-based data into text-based data, the conversion module 208 represents each respective transition 602 with a respective textual component. Specifically, each transition 602 is to be represented by a textual identifier 702 with regard to a current polygon position 704.

A grid of nine polygons 308 is depicted in FIG. 7. Each of the eight exterior polygons 308 is respectively associated with a textual identifier 702, with two textual identifiers 702 illustrated in the top right of FIG. 7. The textual identifiers 702 can be unique to each polygon 308 throughout a repetitive arrangement 306 of polygons 308 (e.g. of FIGS. 5 and 6). For example, each polygon 308 can be assigned a unique number starting from the top left corner and moving to the bottom right corner. Alternatively, a reusable set of textual identifiers 702 can be dynamically allocated to polygons 308, as is described below.

In FIG. 7, the nine-by-nine grid represents a central polygon that corresponds to a current given polygon position 704, as well as neighboring polygons that are adjacent thereto and therefore available for a potential transition 602 to a new polygon. Adjacent polygons share at least one edge or intersect at one or more pixels or points. With the rectangular grid, there are eight adjacent polygons and eight corresponding transitions 602(1)-602(8). The transitions 602(2), 602(4), 602(6), and 602(8) are straight transitions, and the transitions 602(1), 602(3), 602(5), and 602(7) are diagonal transitions. A distinct user movement is recorded if user interaction with one polygon ends and another begins, as represented by a transition 602.

The reusable set of textual identifiers 702 are dynamically distributed around the given polygon position 704 to the adjacent polygons 308. As the path of a gesture pattern 128 is traced, the current given polygon position 704 advances along the path of the gesture pattern 128. After each new polygon becomes the current given polygon position 704, the set of surrounding textual identifiers 702 is likewise advanced. The directional transitions 602 are labeled with eight primary directions, which are the four cardinal directions and the four intermediate or intercardinal directions. Each of these directional transitions 602 corresponds to a textual identifier 702, which includes a numeral in the example of FIG. 7.

Specifically, in the northwest direction, the transition 602(1) is represented by the numeral "1." In the northward direction, the transition 602(2) is represented by the numeral "2." In the northeast direction, the transition 602(3) is represented by the numeral "3." In the eastward direction, the transition 602(4) is represented by the numeral "4." In the southeast direction, the transition 602(5) is represented by the numeral "5." In the southward direction, the transition 602(6) is represented by the numeral "6." In the southwest direction, the transition 602(7) is represented by the numeral "7." In the westward direction, the transition 602(8) is represented by the numeral "8." Although single-digit numerals are used as the textual identifiers 702 in FIG. 7, single digit non-numeric characters or multiple numeric or non-numeric character groups can be used as the textual identifiers 702.

Thus, directional textual identifiers 702 can be used to represent transitions 602 relative to the polygon 308 that is the current given polygon position 704. The textual identifier 702 representative of a transition 602 is incorporated 706 into the text-based representation 132. The text-based representation 132 can therefore include a listing of textual identifiers 702 corresponding to multiple transitions 602 along a path of the gesture pattern 128. Because the polygon 308 with which the end user is interacting is known at any given moment, the delta from one polygon to another, mid-gesture, enables the gesture pattern handling module 124 to keep track of the directionality of the end user's path for any given distinct, individual movement across a polygon boundary. The conversion module 208 can order the textual identifiers 702 in the text-based representation 132 in accordance with the order in which the gesture pattern 128 traverses the corresponding polygons 308.

With reference also to FIG. 6 and the C-shaped gesture pattern 128, the following transitions 602 are made along the path of the gesture pattern 128: westward, westward, northward, northward, eastward, and eastward. Using the example one-digit textual identifiers 702 of FIG. 7, the text-based representation 132 includes the following textual components: "8," "8," "2," "2," "4," and "4." These textual identifiers 702 can be concatenated or appended to form a string-type variable with the following value: "882244." This string holds each of the directional changes of a gesture pattern path, as well as at least the relative lengths of internal segments. The text-based representation 132 can also include an indication of the starting location, such as a unique identifier of the corresponding polygon 308.

Although the example of FIG. 7 uses single-digit numerals as textual identifiers 702, other textual components may alternatively be implemented for the textual identifiers 702. For example, multi-digit numerals, one or more alphabetical characters, one or more special characters, combinations thereof, etc. can be implemented for the textual identifiers 702. The text-based representation 132 can therefore include one or more textual components that represent at least a shape of the gesture pattern 128. These textual components for the text-based representation 132 can include one or more alphanumeric characters, one or more American Standard Code for Information Interchange (ASCII) characters, one or more Unicode characters, a combination thereof, and so forth. The text-based representation 132 can therefore be realized as, for instance, a text string or string-type variable using the textual identifiers 702.

Figure 8:
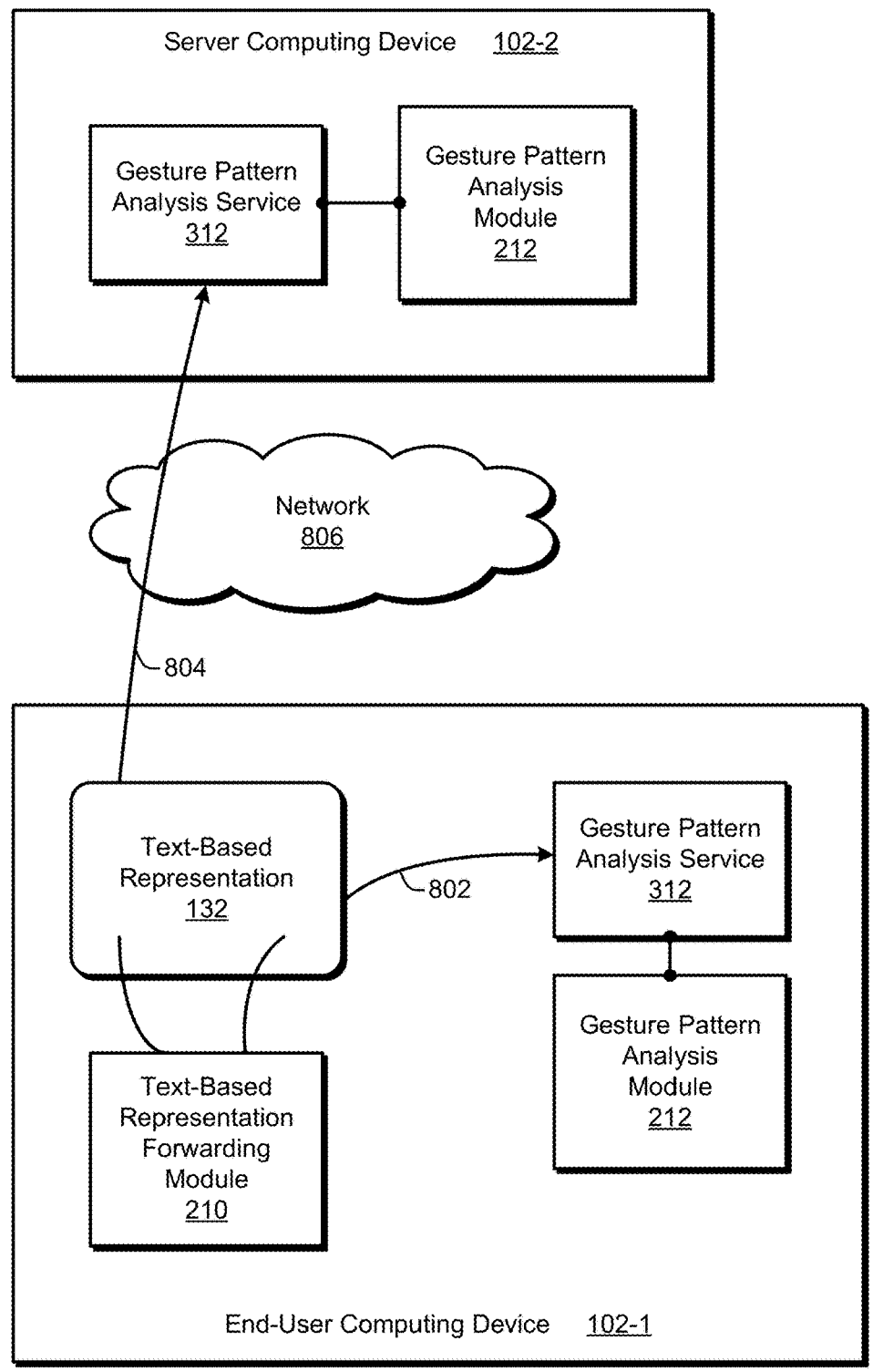
FIG. 8 illustrates an example approach for forwarding the text-based representation to a gesture pattern analysis service.

FIG. 8 illustrates an example approach 800 for forwarding the text-based representation 132 to a gesture pattern analysis service 312. The text-based representation forwarding module 210 implements the approach 800. As illustrated, the approach 800 includes an end-user computing device 102-1 and a server computing device 102-2. In some implementations, the text-based representation forwarding module 210 is executing at the end-user computing device 102-1. A conversion module 208 (of FIGS. 2, 3, and 7) has produced the text-based representation 132. The forwarding module 210 forwards the text-based representation 132 to at least one gesture pattern analysis service 312, which is associated with the gesture pattern analysis module 212.

In one example implementation, the gesture pattern analysis service 312 is resident at the end-user computing device 102-1. Here, the forwarding module 210 forwards 802 the text-based representation 132 to the local gesture pattern analysis service 312 via a local mechanism, such as a local bus, a memory transfer, a provision of a name or address of a file, a granting of access rights to data, some combination thereof, and so forth. The gesture pattern analysis module 212 executes on the end-user computing device 102-1 to perform an analysis that includes the text-based representation 132. Examples of such analysis operations are described below with reference to FIG. 9.

In another example implementation, the gesture pattern analysis service 312 is resident at the server computing device 102-2. Here, the forwarding module 210 forwards 804 the text-based representation 132 to the remote gesture pattern analysis service 312 via a network mechanism, such as over at least one network 806 (e.g., the internet, a Wi-Fi network, a cellular network, or a combination thereof). The gesture pattern analysis module 212 executes on the server computing device 102-2 to perform an analysis that includes the received text-based representation 132.

Figure 9:
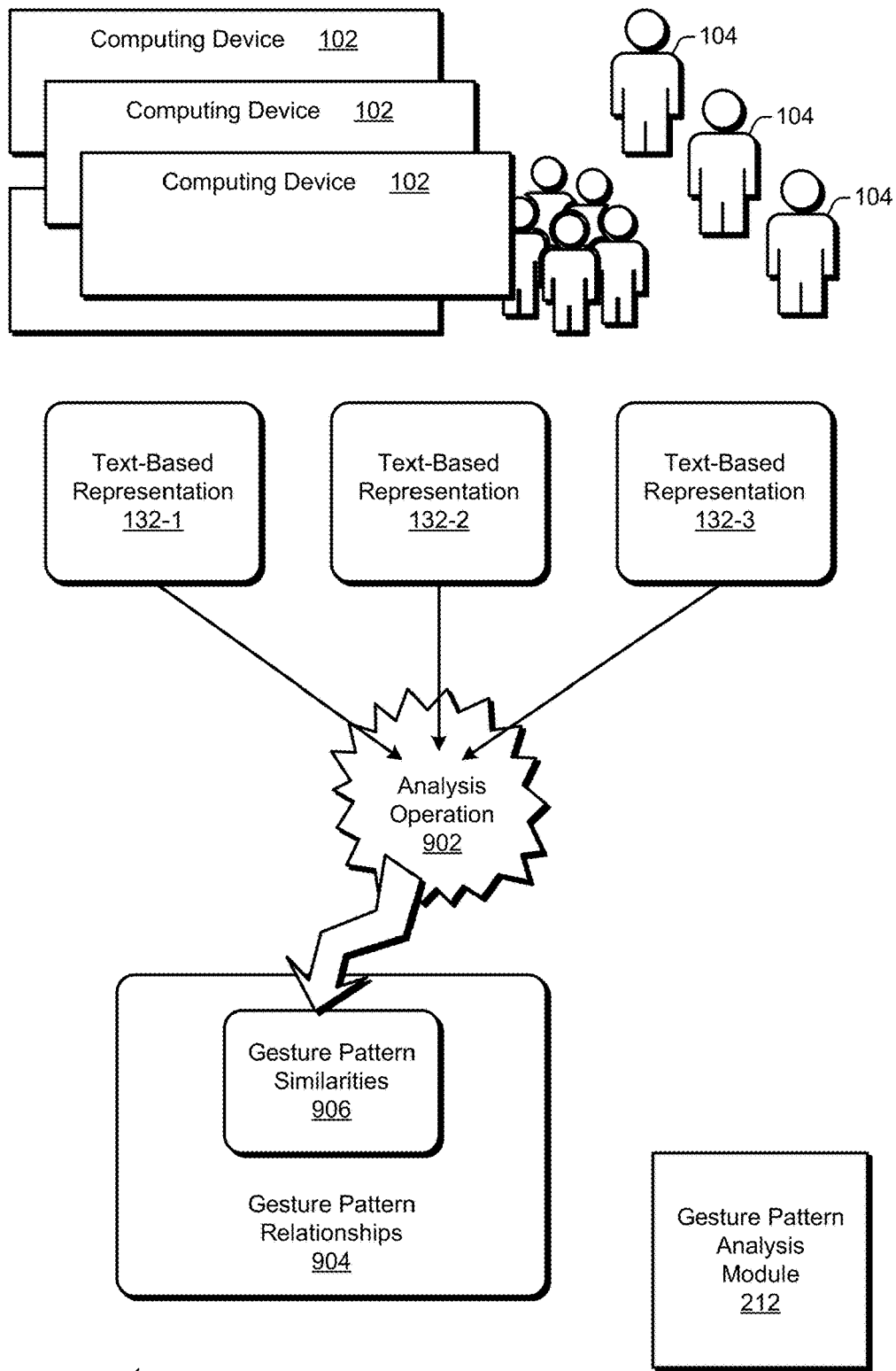
FIG. 9 illustrates an example approach for analyzing multiple text-based representations of multiple gesture patterns acquired from multiple different end users or multiple different end-user computing devices.

FIG. 9 illustrates an example approach 900 for analyzing multiple text-based representations 132 of multiple gesture patterns 128 acquired from multiple different end users 104 or multiple different end-user computing devices 102. The gesture pattern analysis module 212 implements the approach 900. As illustrated, the approach 900 involves multiple computing devices 102 that are associated with multiple end users 104. These multiple computing devices 102 generated multiple instances of text-based representations 132. These text-based representations 132 are input to an analysis operation 902. Although more or fewer text-based representations 132 can be included in the analysis operation 902, three text-based representations 132-1, 132-2, and 132-3 are specifically depicted.

In some implementations, the gesture pattern analysis module 212 is resident at and executing on a server computing device 102-2 (of FIG. 8). In other implementations, the gesture pattern analysis module 212 is resident at and executing on an end-user computing device 102-1 (of FIG. 8). In either case, the computing device executing the gesture pattern analysis module 212 receives the multiple text-based representations 132-1, 132-2, and 132-3 from the other computing devices 102. The gesture pattern analysis module 212 then performs an analysis operation 902 on the received text-based representations 132-1, 132-2, and 132-3.

Conducting the analysis operation 902 discovers one or more gesture pattern relationships 904 among the multiple gesture patterns 128 based on the multiple text-based representations 132-1, 132-2, and 132-3. Gesture pattern relationships 904 can include, for example, correlations among gesture patterns 128 that reveal gesture pattern similarities 906. Gesture pattern similarities 906 can pertain to similarities in terms of shape, size, length, screen location at which a gesture pattern is started or terminated, combinations thereof, and so forth. Because the data representative of the gesture patterns 128 is text-based (e.g., formatted as a string), string analysis tools and techniques can be applied as part of the analysis operation 902. Furthermore, data manipulation tools and techniques that are applicable to text data can be applied to the text-based representation 132 as is described with reference to FIG. 10.

Figure 10:
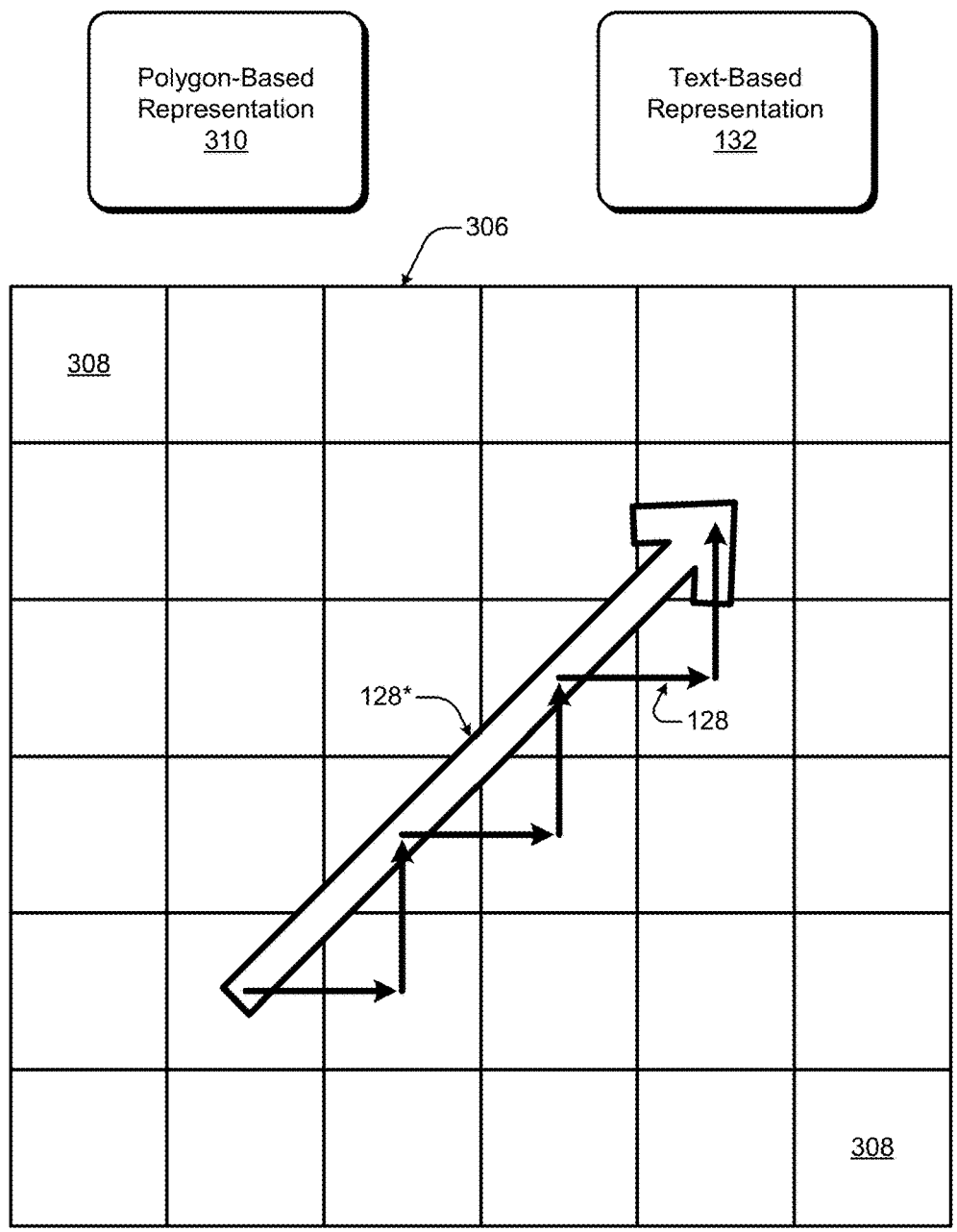
FIG. 10 illustrates an example approach for manipulating a text-based representation of a gesture pattern, such as to compress a size of the text-based representation.

FIG. 10 illustrates an example approach 1000 for manipulating a text-based representation 132 of a gesture pattern 128, such as to compress a size of the text-based representation 132. The text-based representation manipulation module 214 implements the approach 1000. The text-based representation manipulation module 214 manipulates data in a pixel format, in a polygon format, or in a text format such that the resulting text-based representation 132 is enhanced. Enhancements include bandwidth size compression, streamlining of the data, adjusting the data to facilitate analysis, combinations thereof, and so forth. Example data manipulations and related data enhancements are described below.

With respect to data compression, extended pathways can produce repetitive values in the output string (e.g., 8888444422222), and these repetitive values can consume excessive string length and overuse data storage. For these cases, the text-based representation manipulation module 214 can apply a compression function, such as run-length encoding (RLE), in order to shorten the resulting data values to meet size constraints on string length or to ease correlation processing.

Detected data can also be streamlined. For example, a series of stair-stepped movements can be substituted with a diagonal movement. With reference to FIG. 10, the approach 1000 as shown includes a repetitive arrangement 306 of polygons 308. A gesture pattern 128 traverses over the repetitive arrangement 306. The gesture pattern 128 is illustrated with multiple solid, smaller arrows. The multiple solid arrows of the gesture pattern 128 represent a stair-stepped path that results after detection and transformation. Another gesture pattern 128* is illustrated with one unfilled, larger arrow.

Because there exists user error and variations between closely related gestures, pathways that are intended to be diagonals can be detected or represented in polygon form as an alternating series of the cardinal directions, instead of the end user's actual intention, which is a diagonal pathway along an intercardinal direction. Additionally, repeated alternations of textual components in a string cannot ordinarily be compressed efficiently. To ameliorate this situation, a cleaning function is invoked on the initial raw string of textual data that describes the path of the gesture pattern. This cleaning function keeps track of repeated changes in direction that can potentially indicate unintentional user movement. If such a repeated change is recognized, a corresponding set of diagonal values is substituted. For example, a "242424" string, which corresponds to north-east-north-east-north-east movements, is replaced with a "333" string, which corresponds to three northeast movements. Equivalent textual strings, such as a "3243" string (e.g., which likely indicates three intended northeast movements as a general pathway) are also recognized as intended diagonal movements. Such equivalent strings are likewise replaced with the corresponding diagonal movement string.

Generally, the raw data input of the string representation of the gesture pattern is run through the diagonal recognition or cleaning function in order to meet the end user's true intention and streamline the overall shape of the gesture pattern. In FIG. 10, the gesture pattern 128 represents a raw data pathway that is fed into a diagonal recognition function. The gesture pattern 128* represents the result that is output from the diagonal recognition function. Other data streamlining functions, beyond that for diagonal movements, may also be implemented.

As another strategy for manipulating data to facilitate analysis, composites and averages of similar strings are created. To simplify or reduce the overall set of data accumulated, additional well-known algorithms can be applied to the data set to find string similarities. Using these discovered string similarities, overall composites that represent genericized touch patterns or shapes are created. These composites are then used as a baseline of similarity for incoming individual user strings rather than comparing all individual strings to one another. Examples of applicable composite or averaging algorithms include: a variation on Levenshtein' string similarity program, a generalized correlation via hashing of averages, machine learning algorithms to determine similarity, and combinations thereof.

Having discussed example details of systems, techniques, and schemes for facilitating analysis of user interface gesture patterns, consider now some example procedures to illustrate additional aspects of the techniques.

Example Procedures

Figure 11:
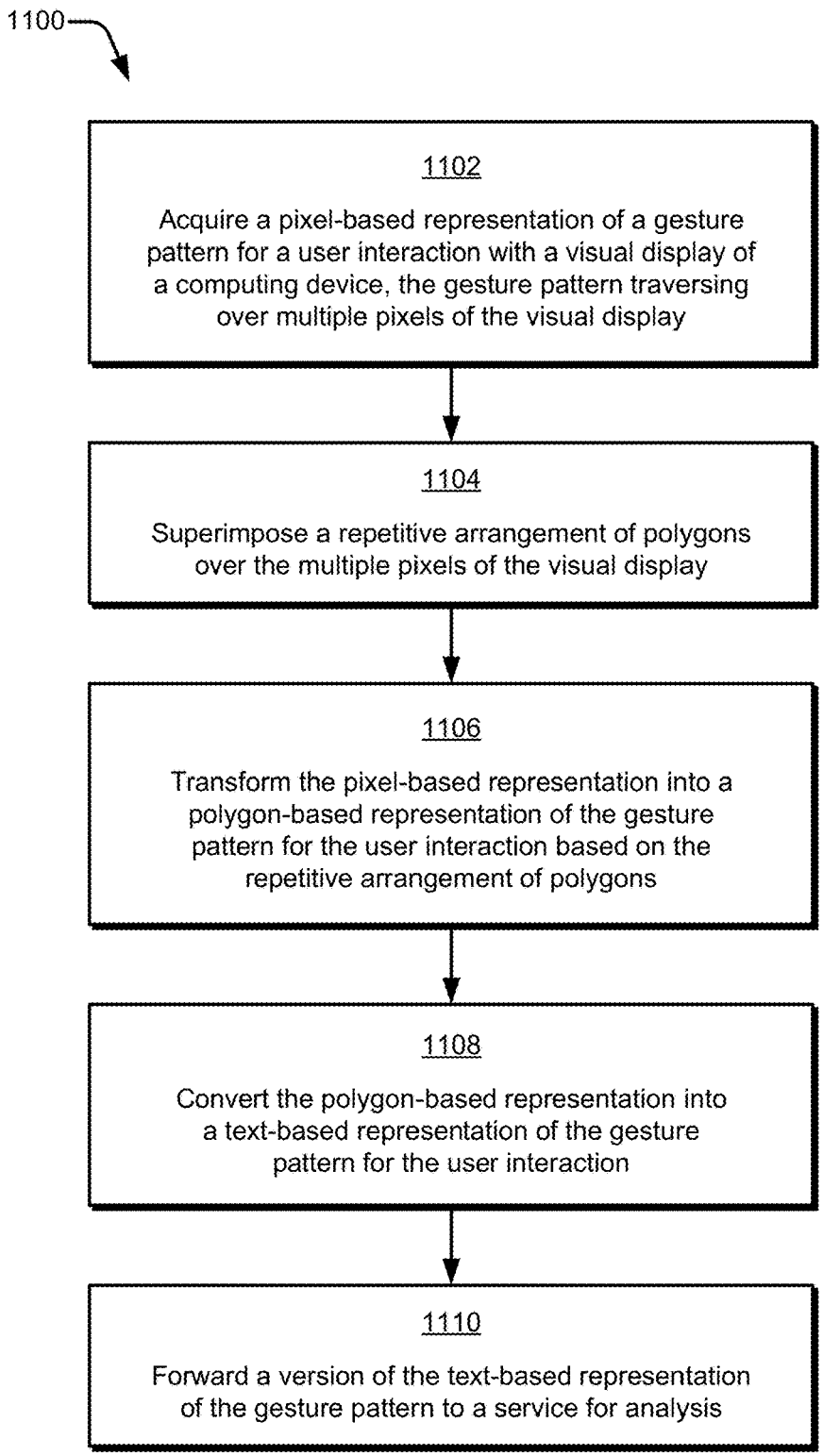
FIG. 11 is a flow diagram illustrating an example procedure in accordance with one or more example implementations.

This section describes with reference to FIGS. 11 and 12 example procedures relating to facilitating analysis of user interface gesture patterns in one or more implementations. Aspects of the procedures may be implemented in hardware, firmware, or software, or a combination thereof. The procedures are shown as sets of blocks specifying operations that may be performed by one or more devices, but performance of the operations is not necessarily limited to the orders as shown by the respective blocks or as described herein, for the operations may be performed in other orders or in fully or partially overlapping manners. In at least some implementations, the procedures may be performed by a suitably configured device, such as an example computing device 102 (of FIGS. 1, 8, and 9) or 1302 (of FIG. 13) using a gesture pattern handling module 124 (e.g., of FIGS. 1, 2, and 13).

FIG. 11 is a flow diagram that includes five blocks 1102-1110 and that illustrates an example procedure 1100 for facilitating analysis of user interface gesture patterns in accordance with one or more example implementations. At block 1102, a pixel-based representation of a gesture pattern for a user interaction with a visual display of a computing device is acquired, with the gesture pattern traversing over multiple pixels of the visual display. For example, a computing device can obtain a pixel-based representation 130 of a gesture pattern 128 for a user interaction with a visual display 302 of a computing device 102 from a local or a remote source, with the gesture pattern 128 traversing over multiple pixels 304 of the visual display 302. The pixel-based representation 130 may directly include one or more pixel coordinates 406 or may have geometric information indirectly identifying pixel coordinates 406.

At block 1104, a repetitive arrangement of polygons is superimposed over the multiple pixels of the visual display. For example, the computing device can superimpose a repetitive arrangement 306 of polygons 308 over the multiple pixels 304 of the visual display 302. To do so, a superimposition module 204 may logically overlay a grid of rectangles on the visual display 302 to thereby virtually segregate groups of pixels into different rectangles.

At block 1106, the pixel-based representation is transformed into a polygon-based representation of the gesture pattern for the user interaction based on the repetitive arrangement of polygons. For example, the computing device can transform the pixel-based representation 130 into a polygon-based representation 310 of the gesture pattern 128 for the user interaction based on the repetitive arrangement 306 of polygons 308. A transformation module 206 may, for instance, determine a set of polygons 308 for the gesture pattern 128 by mapping traversed pixels 304 to corresponding polygons 308 or by detecting transitions 602 of the pixel-based representation 130 between polygons 308.

At block 1108, the polygon-based representation is converted into a text-based representation of the gesture pattern for the user interaction. For example, the computing device can convert the polygon-based representation 310 into a text-based representation 132 of the gesture pattern 128 for the user interaction. A conversion module 208 may, for instance, ascertain respective textual identifiers 702 for respective ones of the polygons 308 in the determined set of polygons 308. Each textual identifier 702 includes at least one alphabetical or numeric character, which may indicate a relative directional transition.

At block 1110, a version of the text-based representation of the gesture pattern is forwarded to a service for analysis. For example, the computing device can forward a version of the text-based representation 132 of the gesture pattern 128 to a service 312 for analysis. To effectuate the forwarding, a forwarding module 210 may locally or remotely forward a version of the text-based representation 132 that has been manipulated to reduce a size thereof prior to the forwarding.

FIG. 12 is a flow diagram that includes three blocks 1202-1206 and that illustrates an example procedure 1200 for facilitating analysis of user interface gesture patterns in accordance with one or more example implementations. At block 1202, multiple text-based representations of gesture patterns of user interactions are received from multiple end-user computing devices. Each respective text-based representation includes a string-type variable that characterizes a shape of a respective gesture pattern based on a repetitive arrangement of polygons overlaid on a visual display having an array of pixels, with each polygon of the repetitive arrangement of polygons corresponding to multiple pixels in the array of pixels. For example, a computing device can receive, from multiple end-user computing devices 102, multiple text-based representations 132-1, 132-2, and 132-3 of gesture patterns 128 of user interactions. Each respective text-based representation 132 includes a string-type variable that characterizes a shape of a respective gesture pattern 128 based on a repetitive arrangement 306 of polygons 308 overlaid on a visual display 302 having an array of pixels 204. Each polygon 308 of the repetitive arrangement 306 of polygons corresponds to multiple pixels 304 in the array of pixels. For instance, a gesture pattern handling module 124 may receive multiple text strings having characters that indicate relative transition directions at each polygon 308 along a path that is specified in polygon space by the corresponding gesture pattern 128.

At block 1204, an analysis operation is performed on the multiple text-based representations. For example, the computing device can perform an analysis operation 902 on the multiple text-based representations 132-1, 132-2, and 132-3. To do so, the gesture pattern handling module 124 may perform a correlation analysis on the multiple text-based representations 132-1, 132-2, and 132-3 using machine learning. At block 1206, a gesture pattern relationship is determined among at least a portion of the multiple text-based representations based on the analysis operation. For example, the computing device can determine a gesture pattern relationship 904 among at least a portion of the multiple text-based representations 132-1, 132-2, and 132-3 based on the analysis operation 902. The gesture pattern handling module 124 may, for instance, determine that the gesture patterns 128 that correspond to the text-based representations 132-1 and 132-3 have a similar shape but different sizes.

Having described example procedures in accordance with one or more implementations, consider now an example system and device that can be utilized to implement the various schemes and techniques described herein.

Example System and Device

Figure 13:
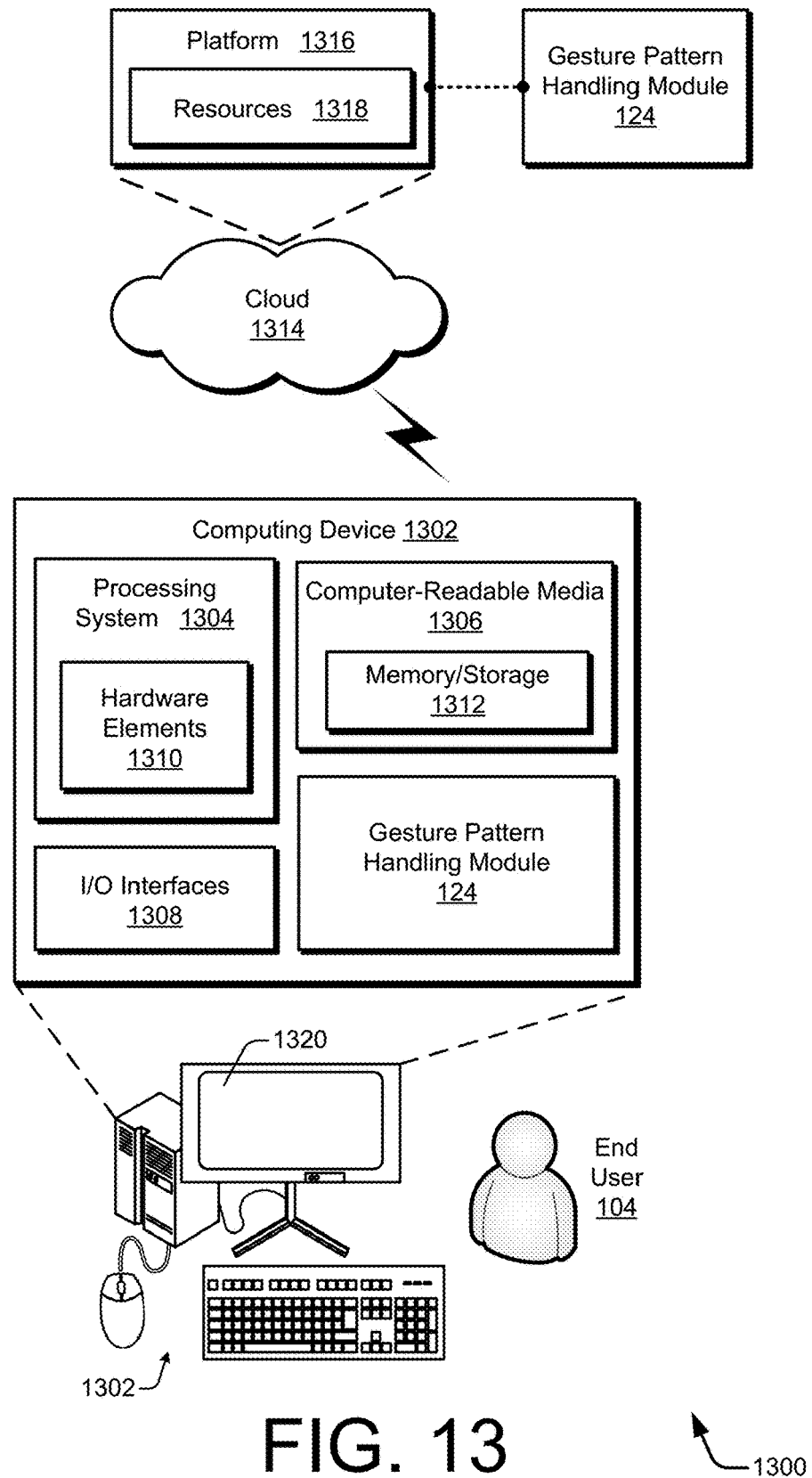
FIG. 13 illustrates an example system including various components of example devices that can be employed for one or more implementations of facilitating analysis of user interface gesture patterns.

FIG. 13 illustrates generally at 1300 an example system including an example computing device 1302 representative of one or more computing systems or computing devices that may implement the various techniques described herein. This is depicted through the inclusion of a gesture pattern handling module 124, which may operate as described herein above. A computing device 1302 may be implemented as, for example, a computing device 102 (e.g., of FIG. 1) in an independent or standalone mode. The computing device 1302 can execute an application or operating system that is capable of detecting user input representative of a gesture pattern on a display screen 1320 (e.g., display screen 120). Generally, a computing device 1302 may be implemented as, for example, an end user device (e.g., a smart phone or desktop computer) of an end user 104, a corporate device (e.g., a server side device or data center hardware) of a business, an on-chip system or system-on-a-chip (SOC) (e.g., that is integrated with a tablet device or a display device), or any other suitable computing device or computing system.

In an example implementation as shown in FIG. 1, the gesture pattern handling module 124 is executing at one location (e.g., within a housing of the computing device 102). However, the gesture pattern handling module 124 can alternatively be executing in the cloud (e.g., on a server or network-side computing device) to generate or analyze text-based representations, and such an example implementation as also shown in FIG. 13. Alternatively, a portion of the gesture pattern handling module 124 can be executing at both a client-side computing device and a server-side computing device. In such an implementation, the operations implemented by the gesture pattern handling module 124 as described herein may be distributed across a client-server architecture.

The example computing device 1302 as illustrated includes at least one processing system 1304, one or more computer-readable media 1306, and one or more I/O interfaces 1308 that may be communicatively coupled, one to another. Although not explicitly shown, the computing device 1302 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including one or more hardware elements 1310 that may be implemented as processors, functional blocks, and so forth. This may include implementation in hardware as an application specific integrated circuit (ASIC), a general-purpose processor, or other logic device formed using e.g. one or more semiconductors. The hardware elements 1310 are not limited by the materials from which they are formed or the processing mechanisms employed therein. For example, processors may include or may be realized with semiconductor(s) or transistors (e.g., electronic integrated circuits (ICs)). In such a context, processor-executable instructions may comprise electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (e.g., random access memory (RAM)) or nonvolatile media (e.g., read only memory (ROM), flash memory, optical discs, or magnetic disks). The memory/storage component 1312 may include fixed media (e.g., RAM, ROM, or a fixed hard drive) or removable media (e.g., a flash memory card, a removable hard drive, or an optical disc). The computer-readable media 1306 may be implemented in a variety of other ways as further described below.

The input/output interface(s) 1308 are representative of functionality to allow a user to enter commands or information to computing device 1302 or to allow information to be presented to the user, or other components or devices using various input/output devices. Examples of input devices include a keyboard, a cursor control device (e.g., a mouse or touchpad), a microphone, a scanner, touch functionality (e.g., capacitive, resistive, or other sensors implemented to detect physical touch), a camera (e.g., which may employ visible or non-visible wavelengths such as infrared frequencies to recognize movement as gestures that need not involve touch), an accelerometer, or a combination thereof. Examples of output devices include a display device (e.g., a liquid crystal display (LCD) screen, a light-emitting diode (LED) display screen, a monitor, or a projector), a speaker, a printer, a network card, a haptic vibrating device, or a combination thereof. Thus, the computing device 1302 may be implemented in a variety of ways as further described below to support local or remote user interaction.

Various techniques may be described herein in the general context of software, hardware elements, or program modules. Generally, such modules may include routines, programs, objects, elements, components, data structures, combinations thereof, and so forth that perform particular tasks or implement particular abstract data types. The terms "module," "functionality," and "component" as used herein generally represent software, firmware, hardware, fixed logic circuitry, or a combination thereof. The features of the techniques described herein may be platform-independent, meaning that the described techniques may be implemented on a variety of commercial computing platforms having a variety of processors.

An implementation of the described modules, and techniques thereof, may be stored on or transmitted across some form of computer-readable media. The computer-readable media 1306 may include a variety of media that may be accessed by the computing device 1302. By way of example, and not limitation, computer-readable media may include "computer-readable storage media" and "computer-readable signal media."

"Computer-readable storage media," as used herein, refers to media or devices that enable persistent and/or non-transitory storage of information in contrast to mere signal transmission, carrier waves, or signals per se. Computer-readable storage media does not include signals per se or signal bearing media. The computer-readable storage media includes hardware such as volatile and non-volatile, as well as removable and non-removable, media or storage devices implemented in a process or technology suitable for storage of information, such as computer readable instructions, data structures, program modules, logic elements/circuits, or other data. Examples of computer-readable storage media include RAM, ROM, EEPROM, flash memory, or other e.g. solid state memory technology; CD-ROM, digital versatile discs (DVD), or other optical storage; hard disks, magnetic cassettes, magnetic tape, magnetic disk storage, or other magnetic storage devices; or another storage device, tangible medium, article of manufacture, or combination thereof that is suitable to store desired information and that may be accessed by a computer.

"Computer-readable signal media," as used herein, refers to a signal-bearing medium implemented to transmit instructions to hardware of the computing device 1302, such as via a network. Computer-readable signal media may typically embody computer readable instructions, data structures, program modules, or other data in a modulated data signal, such as carrier waves, data signals, or another transport mechanism. Computer-readable signal media may also include any information delivery media. The term "modulated data signal" means a signal having one or more of its characteristics set or changed in such a manner as to encode information in the signal. By way of example, computer-readable signal media include wired media, such as a wired network or direct wired connection, or wireless media, such as acoustic, RF, microwave, infrared, or other wireless media.

As previously described, hardware elements 1310 or computer-readable media 1306 may be representative of modules, programmable device logic, fixed device logic, a combination thereof, and so forth that are implemented in a hardware form that may be employed in some implementations to implement at least some aspects of the techniques described herein, such as to perform one or more instructions or computing actions. Hardware may include components of an integrated circuit (IC) or on-chip system, an ASIC, a field-programmable gate array (FPGA), a complex programmable logic device (CPLD), or other implementations in silicon or other hardware. In this context, hardware may operate as a processing device that performs program tasks defined by instructions or logic embodied by the hardware as well as hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer readable storage media or by one or more hardware elements 1310. The computing device 1302 may be configured to implement particular instructions or functions corresponding to software or hardware modules. Accordingly, implementation of a module that is executable by the computing device 1302 as software may be achieved at least partially in hardware, e.g., through use of computer-readable storage media or the hardware elements 1310 of the processing system 1304. The instructions or functions may be executable/operable by one or more articles of manufacture (e.g., one or more computing devices 1302 or processing systems 1304) to implement techniques, modules, or examples described herein.

The techniques described herein may be supported by various configurations of the computing device 1302 and are not limited to the specific aspects of the example devices described herein. This functionality may also be implemented fully or partially through use of a distributed system, such as over a "cloud" 1314 via a platform 1316 as described below.

The cloud 1314 may include or represent a platform 1316 for resources 1318. The platform 1316 abstracts underlying functionality of hardware (e.g., one or more servers or at least one data center) and software resources of the cloud 1314. The resources 1318 may include applications or data that can be utilized while computer processing is at least partially executed on servers remote from, or distributed around, the computing device 1302. Resources 1318 may also include services provided over the Internet or through a subscriber network, such as a cellular or Wi-Fi network.

The platform 1316 may abstract resources and functions to connect the computing device 1302 with other computing devices or services. The platform 1316 may also serve to abstract a scaling of resources to provide a corresponding level of scale to encountered demand for the resources 1318 implemented via the platform 1316. Accordingly, in an interconnected device implementation, implementation of functionality described herein may be distributed throughout the illustrated system of FIG. 13, or at least throughout the cloud 1314 along with the computing device 1302. For example, functionality may be implemented in part on the computing device 1302 as well as via the platform 1316 that abstracts the functionality of the cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium gesture pattern recognition environment, at least one computing device comprising a processing system and at least one computer-readable storage medium, the at least one computing device including:
   an acquisition module to acquire a pixel-based representation of a gesture pattern from a user interaction with a visual display of the computing device, the gesture pattern traversing over multiple pixels of the visual display;
   a superimposition module to superimpose a repetitive arrangement of polygons over the multiple pixels of the visual display;

a transformation module to transform the pixel-based representation into a polygon-based representation of the gesture pattern based on multiple transitions between polygons of the repetitive arrangement of polygons;

a conversion module to convert the polygon-based representation into a text-based representation of the gesture pattern based on a directionality of each transition of the multiple transitions between polygons, the directionality relative to a given polygon position along the gesture pattern; and a forwarding module to output the text-based representation generated based on the gesture pattern.

2. The at least one computing device of claim 1, wherein the text-based representation is descriptive of a shape of the gesture pattern from the user interaction but is independent of a location on the visual display at which the gesture pattern was detected.

3. The at least one computing device of claim 1, wherein the transformation module is to produce the polygon-based representation by determining a set of polygons of the repetitive arrangement of polygons over which the gesture pattern traverses based on the multiple transitions between polygons as indicated by the pixel based representation.

4. The at least one computing device of claim 3, wherein the conversion module is to produce the text-based representation by ascertaining textual identifiers that respectively correspond to polygons in the set of polygons with each ascertained textual identifier respectively corresponding to the directionality of each transition of the multiple transitions between polygons.

5. The at least one computing device of claim 4, wherein the conversion module is to arrange the textual identifiers for the text-based representation in an order that is responsive to an order in which the polygons of the set of polygons are traversed by the gesture pattern.

6. The at least one computing device of claim 4, wherein the conversion module is to reuse a set of textual identifiers at each given polygon, the set of textual identifiers distributed to adjacent polygons that surround the given polygon.

7. The at least one computing device of claim 1, wherein polygons of the repetitive arrangement of polygons are scaled to correspond to a substantially common physical distance across different visual displays having different physical sizes.

8. The at least one computing device of claim 1, wherein polygons of the repetitive arrangement of polygons are scaled such that a substantially common number of polygons spans across each visual display of different visual displays having different physical sizes.

9. In a digital medium environment a system comprising:
means for acquiring a pixel-based representation of a gesture pattern for a user interaction with a visual display of a computing device, the gesture pattern traversing over multiple pixels of the visual display;
means for superimposing a repetitive arrangement of polygons over the multiple pixels of the visual display;
means for transforming the pixel-based representation into a polygon-based representation of the gesture pattern for the user interaction based on the repetitive arrangement of polygons; and
means for converting the polygon-based representation into a text-based representation of the gesture pattern for the user interaction.

10. The system of claim 9, wherein the acquiring means includes means for detecting end user touch input that traverses a portion of a display screen that presents the visual display.

11. The system of claim 9, wherein:
the repetitive arrangement comprises a grid;
the polygons comprise rectangles; and
the superimposing includes logically superimposing the grid of the rectangles over the multiple pixels of the visual display.

12. The system of claim 9, wherein the transforming means includes means for determining polygons of the repetitive arrangement of polygons that are traversed by the gesture pattern.

13. The system of claim 12, wherein the converting means includes means for ascertaining respective textual identifiers for respective ones of the determined polygons.

14. The system of claim 13, wherein:
the converting means includes means for listing the respective textual identifiers in a string-type variable in an order based on a path order defined by the gesture pattern;
the text-based representation includes the string-type variable;
the service includes a remote service; and
further comprising means for transmitting a version of the string-type variable to a remote service via at least one network for gesture pattern analysis including multiple text-based representations from multiple different end-user computing devices.

15. The system of claim 9, further comprising:
means for manipulating data to produce a compressed version of the text-based representation having a reduced bandwidth size.

16. The system of claim 9, wherein:
the acquiring means includes means for receiving the pixel-based representation from a remote end-user computing device; and
further comprising means for analyzing the text-based representation along with multiple other text-based representations from multiple other end-user computing devices to determine at least one relationship among the text-based representations.

17. In a digital medium gesture recognition environment, a method implemented by at least one computing device, the method comprising:
receiving, by the at least one computing device from multiple end-user computing devices, multiple text-based representations of gesture patterns of user interactions, each respective text-based representation including a string-type variable that characterizes a shape of a respective gesture pattern based on a repetitive arrangement of polygons overlaid on a visual display having an array of pixels, each polygon of the repetitive arrangement of polygons corresponding to multiple pixels in the array of pixels;
performing, by the at least one computing device, an analysis operation on the multiple text-based representations; and
determining, by the at least one computing device, a gesture pattern relationship among at least a portion of the multiple text-based representations based on the analysis operation.

18. The method of claim 17, wherein:
the gesture pattern relationship comprises a gesture pattern shape similarity relationship; and the determining comprises determining two or more text-based representations in which the corresponding gesture patterns having similar shapes in accordance with the gesture pattern shape similarity relationship.

19. The method of claim 17, wherein each text-based representation of the multiple text-based representations includes multiple textual identifiers, each textual identifier corresponding to a polygon of the repetitive arrangement of polygons.

20. The method of claim 19, wherein each textual identifier of the multiple textual identifiers is indicative of a relative directional transition from one polygon to an adjacent polygon.

* * * * *